United States Patent
Miller et al.

(10) Patent No.: US 10,181,299 B1
(45) Date of Patent: Jan. 15, 2019

(54) GENERATING DIGITAL CONTENT OVERLAYS IN RELATION TO REAL-WORLD OBJECTS VIA A DISPLAY CASE WITH A MULTI-LAYERED TRANSMISSIVE DISPLAY

(71) Applicant: Adobe Systems Incorporated, San Jose, CA (US)

(72) Inventors: Gavin S. P. Miller, Los Altos, CA (US); Tenell Rhodes, Campbell, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/827,096

(22) Filed: Nov. 30, 2017

(51) Int. Cl.
*G09G 3/36* (2006.01)
*G02F 1/137* (2006.01)
*F21V 14/00* (2018.01)
*G02F 1/1333* (2006.01)

(52) U.S. Cl.
CPC ............ *G09G 3/36* (2013.01); *F21V 14/003* (2013.01); *G02F 1/137* (2013.01); *G02F 2001/13756* (2013.01); *G02F 2001/133374* (2013.01); *G02F 2201/44* (2013.01); *G09G 2300/02* (2013.01); *G09G 2310/08* (2013.01); *G09G 2340/12* (2013.01)

(58) Field of Classification Search
CPC ................................ F21V 3/049; F21V 3/0615
See application file for complete search history.

(56) References Cited

U.S. PATENT DOCUMENTS

| | | | |
|---|---|---|---|
| 9,074,749 B2 * | 7/2015 | Seo | F21V 7/00 |
| 2012/0162268 A1 * | 6/2012 | Fleck | G02F 1/1336 345/690 |
| 2014/0369072 A1 * | 12/2014 | Liao | G02B 6/0068 362/613 |
| 2017/0041598 A1 * | 2/2017 | Smithwick | G09G 3/3406 |
| 2018/0084924 A1 * | 3/2018 | Sun | A47F 3/001 |
| 2018/0108302 A1 * | 4/2018 | Guo | G09G 3/3406 |

OTHER PUBLICATIONS

Hypebox: The Interactive See-Through Experience; https://www.mmt.io/transparent-lcd-touchscreen-display-hypebox/; 2016 MMT GmbH & Co. KG.

* cited by examiner

*Primary Examiner* — Phi Hoang
(74) *Attorney, Agent, or Firm* — Keller Jolley Preece

(57) ABSTRACT

The present disclosure includes systems, methods, computer readable media, and devices that can generate and present a digital overlay over a view of a tangible object within a display case. In particular, the systems and methods described herein can synchronize a switchable diffuser element with a display screen and one or more light sources to alternate between a scatter state and a transparent state based on a display rate. In particular, the disclosed systems and methods can alternate the display screen between an emissive state (for displaying an emitted digital image) and an attenuating state (for displaying a transparency mask image). By synchronously toggling the display screen and the diffuser element between states, the disclosed systems can present a digital overlay superimposed over a view the inside of the display case.

20 Claims, 11 Drawing Sheets

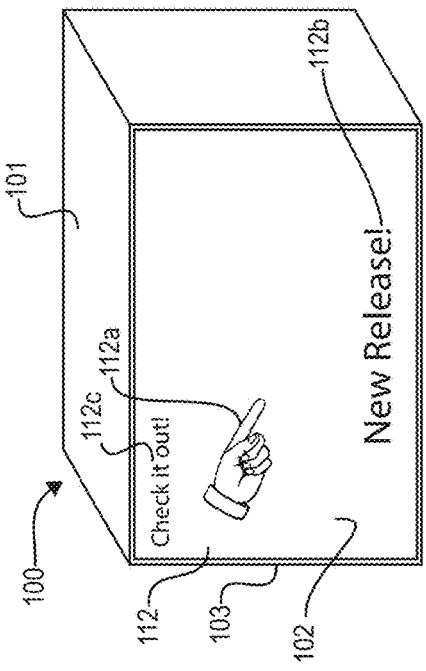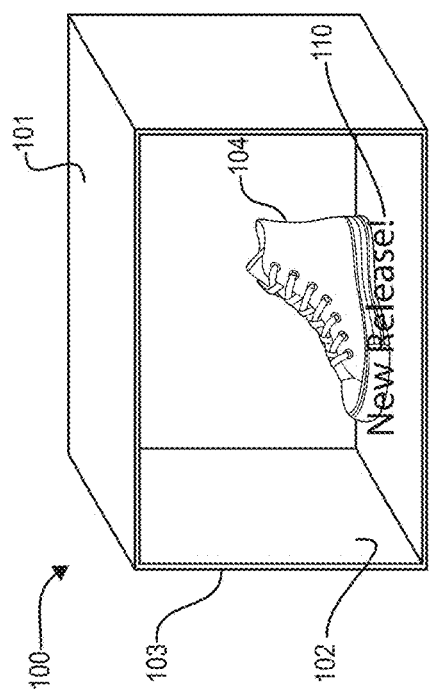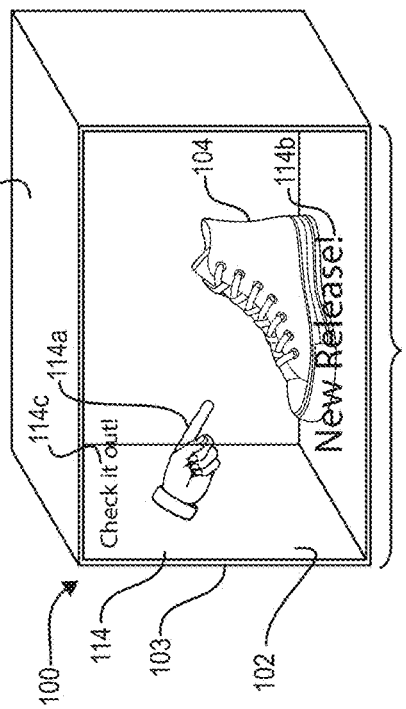

GENERATING DIGITAL CONTENT OVERLAYS IN RELATION TO REAL-WORLD OBJECTS VIA A DISPLAY CASE WITH A MULTI-LAYERED TRANSMISSIVE DISPLAY

BACKGROUND

Recent years have seen rapid development in systems and devices for generating and displaying digital content together with real-world objects. Indeed, developers have generated digital content display systems that can present digital content as a virtual overlay of real-world objects. For example, some digital content display systems utilize display cases that include transparent screens to present digital content while still revealing the contents of the display case.

Although such conventional transparent digital content display systems can present digital content together with a view of real-world objects (e.g., objects within a display case), they nonetheless suffer from a number of shortcomings. For example, some transparent digital content display systems cannot provide digital content overlays that add light to a background scene. Indeed, some conventional transparent digital content display systems utilize transmissive display screens that filter light waves. Accordingly, these conventional transparent digital content display systems are limited in the digital content overlays they can produce. For instance, conventional transparent digital content display systems cannot display bright opaque overlays in front of real-world objects, because displaying white digital content is a result of not filtering light that passes through a display screen.

Other conventional transparent digital content display systems, however, utilize display screens that emit light waves to generate digital content overlays. For example, these conventional digital content display systems can utilize organic light emitting diodes to cover a background view with a digital content overlay. These systems, however, are also limited in the digital content overlays they can produce (i.e., because they can only generate digital content overlays by emitting light). For example, digital content display systems that rely on light emitting diodes cannot provide a black digital overlay on a bright background view, because such light emitting systems cannot control/adjust the opacity of a digital content overlay.

To address these shortcomings, some conventional digital content display systems place limitations on regions for displaying digital overlays. For example, conventional digital content display systems often include a region of a screen for displaying tangible objects, and then provide a separate region of the screen for providing digital overlays, where the background scene is relatively uniform. These systems thus fail to utilize the entire display screen and further prevent immersive digital content (e.g., digital content that appears to interact as an overlay to a real-world object).

Thus, there are several disadvantages with regard to conventional transparent digital content display systems.

SUMMARY

One or more embodiments described herein provide benefits and solve one or more of the foregoing or other problems in the art with systems, methods, non-transitory computer-readable media, and devices for generating and presenting digital overlays on a view of tangible objects by utilizing a switchable diffuser with a display screen. In particular, the systems described herein can utilize the switchable diffuser and the display screen to provide a rapidly alternating view between an emitted light image and a transparency mask image (that attenuates light coming from objects in the display case). The disclosed systems can rapidly alternate between the emitted light image and the transparency-mask-image modulated background view at a display rate such that, the emitted light image and the attenuated background view combine into a digital overlay that appears simultaneously with (e.g., superimposed over) the objects in the display case. In this manner, the disclosed systems can emit and attenuate light waves for a digital overlay to a view of a tangible object in a display case and provide a digital overlay utilizing any part of the display screen, regardless of color, shape, or location of the objects within the display case. Thus, the disclosed systems can accurately depict opaque or semi-transparent dark objects over a bright or dark background, as well as accurately depict bright opaque or semi-transparent foreground graphics over a light or dark background.

For instance, in one or more embodiments, the disclosed systems include a display case that is made up of a housing (with an ambient light source), a display screen, a switchable diffuser, and a diffuser direct light source. To illustrate, the display case may include a liquid crystal display ("LCD") screen that filters light that passes through the liquid crystals from behind. The switchable diffuser can transition between a scatter state (e.g., a state that spreads light passing through over a wide angle thus looking like frosted glass) and a transparent state (looking like smooth glass) at a frequency faster than is visible to the naked eye. The disclosed systems can provide an emitted light image via the display screen while the switchable diffuser is in the scatter state and can provide a transparency mask image via the display screen when the switchable diffuser is in the transparent state. The switchable diffuser may alternate between translucent (i.e. scattering) and transparent at a frequency that generates a digital overlay that appears to include both the emitted light image and the transparency-mask-image modulated background view. Moreover, by alternating the diffuser between the scattering and transparent state at the display rate, the disclosed systems can provide the digital overlay and an attenuated view of contents within the display case together.

The disclosed systems, methods, computer-readable media, and devices provide a number of improvements over conventional display systems. As an initial matter, by generating a digital overlay that reflects both an emitted light image and a transparency mask image, the digital content overlay system can generate digital overlays that are composed of light waves added to and attenuated from a background view. Accordingly, the digital content overlay system can generate digital overlays over a view of a real-world object, regardless of color, shape, or location of the object. Moreover, the digital content overlay system can also generate transparent or semi-transparent digital overlays. Indeed, the digital content overlay system can utilize the emitted light image to control color of the digital overlay and the transparency mask image to control opacity of the digital overlay. Accordingly, the disclosed systems can generate any variety of digital overlays (e.g., transparent and semi-transparent images, solid or opaque images, text, video, animated content, or other digital content) such that the digital content appears to be directly overlaid on an object within a display case. Moreover, in one or more embodiments, the disclosed systems can increase flexibility by expanding the creative space available for providing digital overlays. Indeed, the disclosed systems allow developers to freely utilize the entire display screen without concern for where an object within the display case may interfere with generated digital content.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 1A-1C illustrate an example display case presenting a digital overlay and a view of a tangible object in accordance with one or more embodiments;

DETAILED DESCRIPTION

Figure 2:
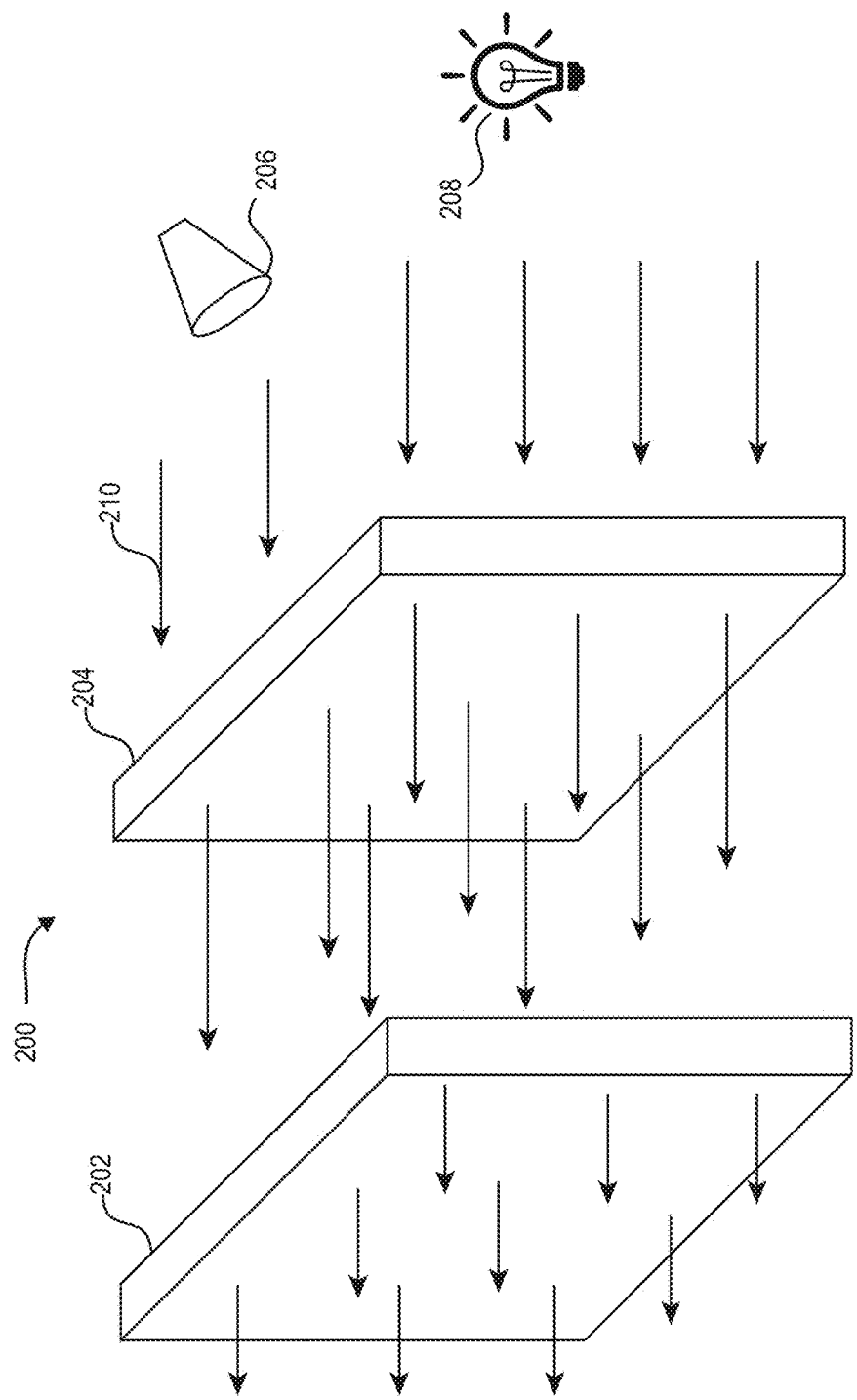
FIG. 2 illustrates an example configuration of components of a display case in accordance with one or more embodiments.

One or more embodiments described herein provide benefits and solve one or more of the foregoing or other problems in the art with a digital content overlay system that generates and presents digital overlays on a background view of tangible objects utilizing at least one switchable diffuser with a display screen. In particular, the digital content overlay system can generate a digital overlay utilizing the switchable diffuser and the display screen by rapidly alternating between an emitted light image and a background view of objects in a display case attenuated by a transparency mask image. For instance, the disclosed systems can alternate between the emitted light image and the background view attenuated by the transparency mask image at a display rate such that the emitted light image and the background view modified by the transparency mask image generate a composite view with the objects in the display case. In this manner, the digital content overlay system can provide a digital overlay of a variety of colors and opacities utilizing any part of the display screen, regardless of color, shape, or location of the objects within the display case.

To illustrate, the digital content overlay system can include a display case for presenting computer-generated digital content overlaid on a view of tangible objects within the display case. The display case can include a display housing that includes an open face (or more than one open face) and an internal cavity within the display housing. In addition, the display case can include display screens over one or more of the open faces of the display housing. Each display screen can alternate, based on a display rate, between an emissive state (where the display screen filters light emitted from a diffuser direct light source to display an emitted light image) and an attenuating state (where the display screen filters light from the internal cavity of the display housing to display a transparency mask image). Further, the display case can include at least one diffuser element within the display housing (e.g., behind the display screen) where the diffuser element alternates between a transparent state and a scatter state based on the display rate. The diffuser element and the display screen can alternate based on a common display rate that is faster than frequencies perceptible to the human eye, creating a digital overlay projected on top of the contents of the internal cavity of the display case. When in the scatter state, the diffuser scatters light falling on it from behind over a wide angle, as viewed from the other side. In this state, the diffuser blurs the direct view of background objects and acts as a diffuse backlight for the image present on the transmissive display in front of it.

Accordingly, the digital content overlay system can control color and opacity of the resulting digital overlay. In particular, by controlling the display rate, the transparency mask image, and the emitted light image, the digital content overlay system can generate a digital overlay of a variety of different colors at a variety of opacity levels. For example, the digital content overlay system can control color of the digital overlay utilizing the emitted light image and control the opacity of the digital overlay based on the transparency mask image. The digital content overlay system can also control the fraction of time that the display screen presents the transparency mask image and the fraction of time that the display screen presents the emitted light image. Thus, the digital content overlay system can control the overall brightness of the transparency mask image and the emitted light image.

As mentioned, the display screen can filter light that passes through the display screen. For instance, the display screen can include a liquid crystal display ("LCD") display that filters light that passes through the liquid crystals from behind the display. As will be described in further detail below, the display screen displays digital content (e.g., a digital overlay) by filtering various wavelengths of light emanating from one or more light sources located behind the display screen. The display screen can alternate, based on a display rate, between an emissive state (where the display screen filters light that emanates from a diffuser direct light source) and an attenuating state (where the display screen filters light from tangible objects and the interior of the internal cavity). Thus, in the emissive state, the display screen can generate an emitted light image and, in the attenuating state, the display screen can generate a transparency mask image. By alternating between the emissive state and the attenuating state at the display rate, the digital content overlay system can generate a digital overlay (i.e., a composite of the emitted light image and the transparency mask image modulated background view).

As also mentioned, the display case can include at least one diffuser element. The diffuser element can include a switchable diffuser that alternates, in response to an electrical stimulus, between a transparent state and a scatter state. Additionally, the digital content overlay system can synchronize the diffuser element with the display screen to alternate between the transparent state and the scatter state based on the display rate. For example, the digital content overlay system can alternate the display screen and the diffuser element such that, at a first point in time, the display screen is in the emissive state and the diffuser element is in the scatter state (such that the diffuser element acts as a backlight), and at a second point in time, the display screen is in the attenuating state and the diffuser element is in the transparent state (such that the diffuser element acts as a window to objects in the display case).

Additionally, the display case can include a diffuser direct light source. In particular, the diffuser direct light source can illuminate the display screen when the diffuser element is in a scattering state to assist the digital content overlay system in generating a digital overlay. In one or more embodiments, the diffuser direct light source is aligned to project light in a direction from the diffuser element (e.g., behind the display screen) toward the display screen. Similar to the diffuser element, the diffuser direct light source can alternate, based on the display rate, between an on state (where the diffuser direct light source illuminates the display screen through the diffuser element) and an off state (where the diffuser direct light source is inactive). For instance, the digital content overlay system can synchronize the diffuser direct light source with the display rate such that the diffuser direct light source is on when the diffuser element is in a scattering state (e.g., such that the diffuser element acts as a backlight surface for the display screen when the diffuser is illuminated by the diffuser direct light source).

In some embodiments, the display case also includes an ambient light source. For example, the display case can include an ambient light source that is located within the internal cavity within the display housing (e.g., a light source that is aligned to project light from within the internal cavity of the display housing). The ambient light source can alternate, based on the display rate, between an on state (where the ambient light source illuminates the display screen) and off state (where the ambient light source is inactive). Furthermore, the digital content overlay system can synchronize the ambient light source with the display screen, the diffuser element, and/or the diffuser direct light source. For instance, the digital content overlay system can synchronize the ambient light source such that the ambient light source is in an on state when the diffuser direct light source is in an off state and the diffuser element is in a transparent state (such that the ambient light source illuminates the display screen through the diffuser element).

As mentioned above, the digital content overlay system can alternate views based on a display rate. For example, the digital content overlay system can alternate between an attenuating view and an emissive view. For instance, the attenuating view can include a view of a tangible object within the internal cavity of the display case as modulated by a transparency mask image generated by filtering passive light that passes through the display screen. The emissive view can include an emitted light image generated by filtering light that passes through the display screen emitted from a diffuser direct light source.

To elaborate, in one or more embodiments, the digital content overlay system synchronizes the diffuser element with the display screen according to a display rate so that half the frames display different views. For example, on half of the frames, the digital content overlay system can make the diffuser element transparent while the display screen attenuates (e.g., filters) light that passes through the transparent diffuser element from the internal cavity. On the other half of the frames, the digital content overlay system can make the diffuser element translucent (e.g., by increasing the scattering of light by the diffuser) while the display screen filters light from a diffuser direct light source. In one or more embodiments, the digital content overlay system alternates between these views at the display rate to generate a composite view of a digital overlay superimposed on the internal cavity of the display case.

The digital content overlay system provides several advantages over conventional digital content display systems. For instance, by utilizing switchable diffuser elements that can transition between a scatter state and a transparent state (at a rate faster than the naked eye can perceive), the digital content overlay system can present a digital overlay on a view of an object within a display case. Indeed, in contrast to conventional systems, the digital content overlay system can accurately depict opaque or semi-transparent dark objects over a bright or dark background, as well as accurately depict bright opaque or semi-transparent foreground graphics over a light or dark background. Thus, the digital content overlay system can control both color and opacity of digital overlays by adding light via an emitted light image and attenuating light from a background view utilizing a transparency mask image.

Furthermore, the digital content overlay system can increase flexibility by utilizing all areas of a display screen in providing a digital overlay. In contrast to conventional systems, the digital content overlay system is not limited to particular portions or regions of a display screen (e.g., regions that do not overlap an object within the display case). Rather, the digital content overlay system can provide a digital overlay anywhere on a display screen, allowing for more immersive digital content that interacts with objects within a display case.

More detail regarding the digital content overlay system will now be provided with reference to the figures. For example, FIGS. 1A-1C illustrate an example display case 100 as part of the digital content overlay system. An overview of the display case 100, including the components included therein, is provided with reference to FIGS. 1A-1C. Thereafter, a more detailed description of the components and processes of the display case 100 and the digital content overlay system is provided with reference to the subsequent figures.

FIGS. 1A-1C illustrate the display case 100 from different perspectives (e.g., at different points in time). Specifically, FIG. 1A illustrates the display case 100 at an initial point in time, and FIG. 1B illustrates the display case 100 at a subsequent point in time. FIG. 1C illustrates the display case 100 as seen by a viewer with the naked eye. Thus, the digital content overlay system can repeatedly (and quickly) alternate the display case 100 from the view of FIG. 1A to the view of FIG. 1B to generate the perspective of FIG. 1C.

FIG. 1A illustrates the display case 100, including a display housing 101 and a display screen 102 located over an open face 103 of the display housing 101. In addition, the display housing 101 houses an object 104 (e.g., a shoe). FIG. 1A shows the display case at an initial point in time. In particular, FIG. 1A illustrates a single given frame of the display screen 102 at the initial point in time. At the initial point in time, the digital content overlay system sets the display screen 102 to an attenuating state to reveal the object 104 within the cavity of the display housing 101.

In the attenuating state shown in FIG. 1A, the display screen 102 also filters light that passes out through the display screen 102 from within the display housing 101. Specifically, the display screen 102 filters light (including light reflecting from the object 104) to generate a transparency mask image 110 (that includes a content item illustrated as the text, "New Release!"). As used herein, the term "transparency mask image" refers to a visible result of filtering light that passes through a display screen while the display screen is in the attenuating state. A transparency mask image can include one or more digital content items that are a result of a display screen filtering light that passes through the display screen from within the display housing (e.g., not light from the diffuser direct light source). A transparency mask image can also include a portrayal of tangible objects and/or the interior of the display housing. Indeed, a transparency mask image can refer to all of the light that passes through the display screen when the display screen is in the attenuating state.

As used herein, the term "display screen" (or sometimes simply "screen") refers to an electronic display or monitor. In particular, the term display screen includes an electronic display for presenting digital content. A display screen can include a monitor that is transparent (e.g., capable of transmitting all visible light wavelengths) and that is independent of, or separate from, a backlight. Moreover, a display screen can include filtering elements that can selectively modify light waves passing through the screen. For example, a display screen can include an LCD screen. More specifically, a display screen may refer to an LCD screen such as, for example, a twisted nematic ("TN") LCD, an in-plane switching ("IPS") LCD, a super in-plane switching ("S-IPS") LCD, an advanced fringe field switching ("AFFS") LCD, a vertical alignment ("VA") LCD, or a blue phase mode LCD.

In embodiments where the display screen is an LCD screen, the display screen can include multiple layers such as a horizontal polarizing film (e.g., a polarizing film that allows only horizontal light waves to pass through), a liquid crystal layer (e.g., layer for modifying orientation of particular light waves and/or frequencies), and a vertical polarizing film (e.g., a polarizing film that allows only vertical light waves to pass through).

In relation to FIG. 1A, the display screen 102 filters light by way of various layers. For example, the display screen 102 filters wavelengths of visible light projected through the layers of the display screen in a direction from behind the display screen outward through the screen. To display the various colors for presenting attenuated light images (e.g., the transparency mask image 110), the display screen 102 filters light wavelengths (e.g., by way of the liquid crystal layer) from a source light within the display housing 101 (e.g., light from within the display housing 101 reflecting off the object 104).

As mentioned in relation to FIG. 1A, the digital content overlay system sets the display screen 102 in an attenuating state. In particular, the display screen 102 filters passive light that emanates outward from within the display housing 101. In some embodiments, the display screen 102 is transparent so that, when the display screen 102 is in the attenuating state, the display screen 102 reveals the contents of the display housing 101. Indeed, as illustrated in FIG. 1A, the display screen 102 passes light from the interior (e.g., the internal cavity) of the display housing 101, including the light that makes up the image of the object 104. Thus, the display screen 102 reveals the object 104 within the display housing 101 while also filtering light through some portions (e.g., pixels) of the display screen to generate the transparency mask image 110.

As briefly described above, the digital content overlay system alternates the display screen 102 between an attenuating state at an initial point in time (e.g., as illustrated in FIG. 1A) and an emissive state at a subsequent point in time (e.g., as illustrated in FIG. 1B). In particular, FIG. 1B illustrates the display case 100 including the display housing 101, the open face 103, and the display screen 102 over the open face 103. The display screen 102 of FIG. 1B displays an emitted light image 112 that includes digital content items 112a-112c.

As used herein, the term "emitted light image" refers to a visible portrayal of digital content items generated by a display screen filtering light in an emissive state. An emitted light image can include digital content items that are generated by filtering light emitted from a diffuser direct light source. In some embodiments, the diffuser direct light source projects or emits a white light. Thus, an emitted light image can include a digital content item of any color that results in filtering select wavelengths (or no wavelengths) from the while light that passes through the display screen.

As mentioned, the digital content overlay system can alternate views to generate a digital overlay from a transparency mask image and an emitted light image. As used herein, the term "digital overlay" refers to a visible portrayal of digital content items. In particular, the term "digital overlay" includes digital content presented or displayed by way of a display screen (e.g., the display screen 102) that comprises digital content items of a transparency mask image as well as an emitted light image. A digital overlay can include one or more digital content items (e.g., digital image, digital video, digital text). A digital overlay (e.g., the visible combination of digital content items within a transparency mask image and an emitted light image) can appear overlaid on a view of one or more tangible objects (e.g., the object 104 as seen within the transparency mask image) within the cavity of the display housing 101. For instance, a digital overlay can be superimposed (e.g., appear superimposed) on light emanating from the internal cavity (e.g., light from any tangible objects within the cavity).

As illustrated in FIG. 1B, the digital content overlay system sets the display screen 102 in an emissive state and filters light to display the emitted light image 112 comprising the digital content items 112a-112c. For example, the display screen 102 filters light from a diffuser direct light source to display the text of the digital content item 112c ("Check it out!") as well as the pointing finger image of the digital content item 112a, and the text of the digital content item 112b ("New Release!"). The digital content overlay system can display each digital content item of the emitted light image 112 in any color. Furthermore, although FIG. 1B illustrates the emitted light image 112 including a particular number and arrangement of digital content items, the emitted light image can include additional, fewer, or different digital content items (and/or in a different arrangement).

FIG. 1B shows the display screen 102 displaying the emitted light image 112 while the object 104 of FIG. 1A is not visible. As will be described in further detail below, the display case 100 includes a diffuser element located behind the display screen 102 that alternates between transparent (e.g., like smooth clear glass) and scattering (e.g., like rough frosted glass) based on the display rate of the display screen

102. To elaborate, the digital content overlay system sets the diffuser element to a transparent state and sets the display screen 102 to an attenuating state (thus, revealing the object 104, as illustrated in FIG. 1A). In relation to FIG. 1B, however, the digital content overlay system sets the diffuser element to a scatter state, blurring a view of the object 104. While translucent, the diffuser element acts as a backlight for the display screen 102 by scattering light that falls on it from behind. More specifically, the diffuser element scatters the light over a wide angle to blur any image of objects that might otherwise be visible behind the diffuser element, while also providing light (e.g., by "glowing") to illuminate the display screen 102. Thus, the digital content overlay system can set the diffuser element to a scatter state and the display screen 102 to an emissive state and provide a light source to assist in displaying the emitted light image 112.

As mentioned above, the display screen 102 alternates between the attenuating state of FIG. 1A and the emissive state of FIG. 1B according to a display rate. As used herein, the term "display rate" refers to a rate or frequency of changing a display screen (or pixels of a display screen) and/or a diffuser element. In particular, the term display rate includes a rate or frequency of alternating a display screen between an attenuating state and an emissive state (or vice-versa). The display rate may be expressed in Hertz ("Hz"). In some embodiments, the display rate is limited by a refresh rate associated with the display screen 102. A refresh rate is generally defined as a rate at which a display can redraw every pixel on the display. Some display screens have a refresh rate of 144 Hz, while other display screens have a refresh rate of 120 Hz, 72 Hz, 60 Hz, or 30 Hz. However, in other embodiments, the display rate may include a frequency higher than 144 Hz (e.g., 240 Hz or even up to 300 Hz). At 144 Hz, the display screen 102 can perform up to 144 transitions per second. Thus, in these embodiments the display screen 102 can display up to 72 emitted light images (frames) per second as well as 72 transparency mask image modulated background views (frames) in the same second. In one or more embodiments, the display rate is fast enough (e.g., above 60 Hz) such that, when the display screen 102 on the display case 100 is observed by the naked eye, the transitions between the emissive state and the attenuating state are imperceptible and the view (e.g., the digital overlay that is a combination of the transparency mask image and the emitted light image) of the display screen appears constant.

As shown in FIG. 1C, by alternating between the attenuating state and the emissive state at the display rate, the display screen 102 presents a view of the object 104 and the digital overlay 106 (e.g., a composite view of the emitted light image and the background view as attenuated by the transparency mask image). In particular, FIG. 1C illustrates the display case 100 as observed by a viewer in real time where the features of FIG. 1A and the features of FIG. 1B are simultaneously visible.

As illustrated in FIG. 1C, the digital overlay 106 can provide a digital overlay 114 with digital content items 114*a*-114*c* superimposed over all or part of the object 104 within the cavity of the display housing 101. As shown, all or part of the digital overlay 114 can be positioned on the display screen 102 such that the digital overlay 114 appears in front of (or over) a view of the object 104. Indeed, the display screen 102 can provide the digital overlay 114 over all or part of the object 104, regardless of the shape, position, or color of the object 104.

In addition, the digital content overlay system can vary the opacity of the digital overlay 106 overlaid over the object 104. In particular, the digital content overlay system can vary opacity to adjust the visibility of the object 104 through any digital content items. Specifically, the digital content overlay system can vary opacity utilizing the transparency mask image 110.

To illustrate, in relation to FIG. 1C, the digital content overlay system generates the digital content item 114*b* as an opaque digital content item based on the transparency mask image 110. Specifically, the digital content item ("New Release!") of the transparency mask image 110 overlaps the digital content item 112*b* on the display screen and has transparency values less than one, corresponding with the graphic shape of the region. Accordingly, when alternating between the transparency mask image 110 and the digital content item 112*b* of the emitted digital image 112, the digital content item 114*b* of the digital overlay 114 appears opaque. Specifically, the digital content item 114*b* takes on the color of the emitted digital image 112 and is opaque because the transparency mask image 110 acts as a mask, filtering light from within display housing 101. Combining the mask of the transparency mask image 110 with the color of the digital content item 112*b* from the emitted digital image 112 results in a colored, opaque digital content item 114*b* of the digital overlay 114.

The digital content overlay system can also generate a transparent, semi-transparent, or opaque digital overlay based on the transparency mask image 110. For example, the digital content item 114*a* of the digital overlay is transparent. Specifically, the digital content item 114*a* takes on the color of the digital content item 112*a*. Because the transparency mask image 110 is at maximum transparency in the region of the digital content item 112*a* from the emitted light image 112, the digital content item 112*a* is combined with light waves coming from the inner cavity of the housing 101. Combining the digital content item 112*a* from the emitted light image 112 with light waves from the housing 101 makes the digital content item 114*a* of the digital overlay 114 appear glowing and transparent.

In this manner, the digital content overlay system can utilize the emitted digital image 112 to control color of the digital overlay 114 while utilizing the transparency mask image 110 to control opacity.

Although FIGS. 1A-1C illustrate a display case 100 including a single open face 103 with a single display screen 102, in some embodiments the display case 100 can include more than one open face (each open face having a corresponding display screen). For example, the display case 100 can even include display screens covering open faces on all sides of the display case 100. Additional detail regarding the various embodiments of the display case 100 is provided below with reference to FIGS. 6 and 7.

Figure 3:
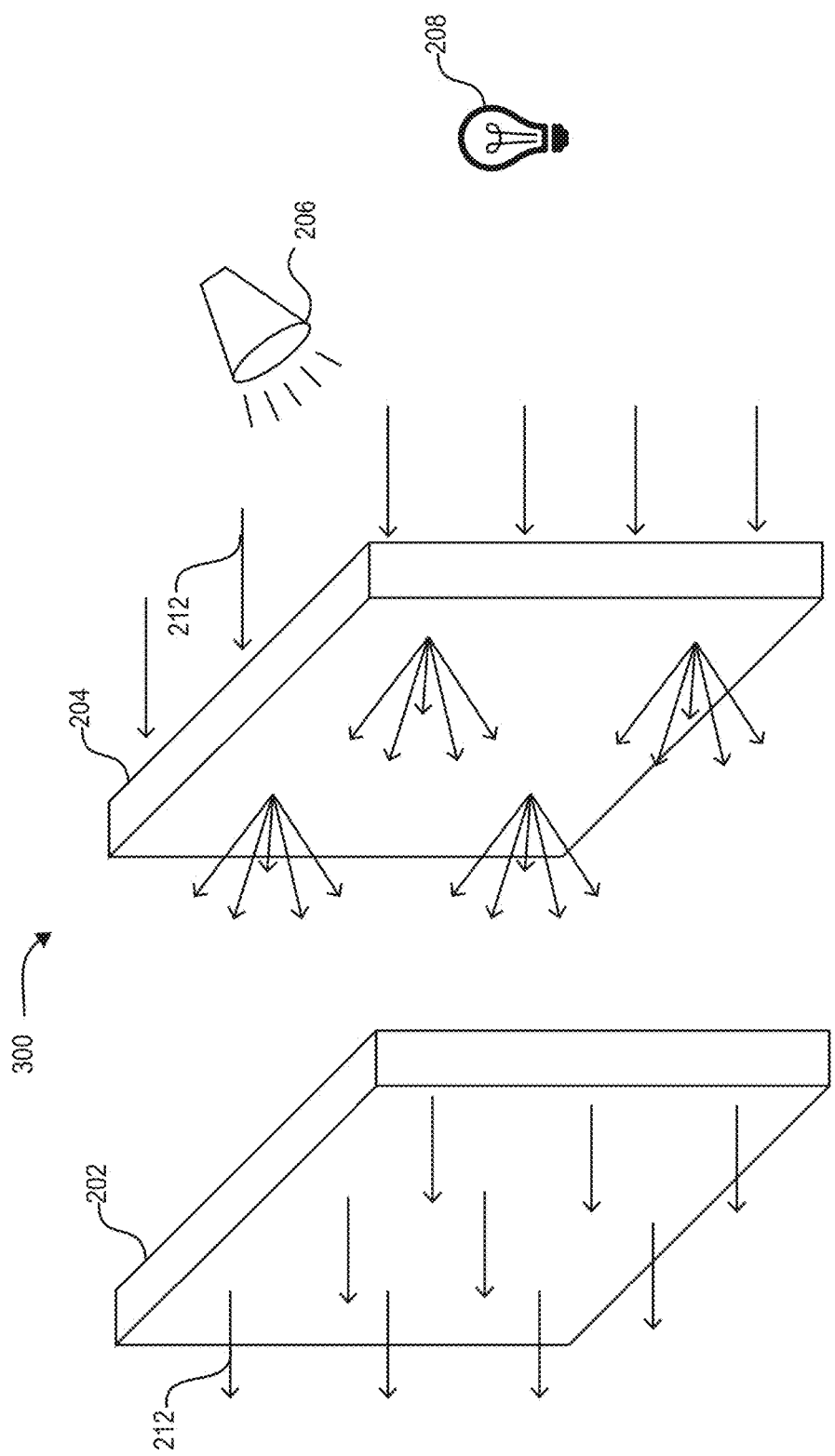
FIG. 3 illustrates another example configuration of components of a display case in accordance with one or more embodiments.

As briefly described above, a display case utilized by the digital content overlay system can include various components. For instance, a display case can include a display housing, a display screen, a diffuser element, a diffuser direct light source, and/or an ambient light source. For example, FIGS. 2-3 illustrate a display screen 202, a diffuser element 204, a diffuser direct light source 206, and an ambient light source 208 in accordance with one or more embodiments. Specifically, FIG. 2 illustrates an example environment 200 with the display screen 202 in an attenuating state and the diffuser element 204 in a transparent state (thus revealing the interior of the display housing 101 while also displaying a transparency mask image). Thereafter, FIG. 3 illustrates an example environment 300 with the display screen 202 in an emissive state and the diffuser element 204 in a scatter state (displaying an emitted light image).

As used herein, the term "diffuser element" (or "switchable diffuser" or sometimes simply "diffuser") refers to an object that selectively scatters or transmits (e.g., passes) light. In particular, a diffuser element includes an object that can alternate between a transparent state and a scatter state. More specifically, a diffuser element can include a sheet, screen, film, or layer of material that can alternate between a transparent state to pass light (e.g., such that it appears like glass) and a scatter state to scatter light (e.g., such that it appears like a mirror). For instance, the diffuser element can be composed of a material that, in response to electrical stimulation, transitions from translucent (i.e., scattering) to transparent or vice-versa. Additionally, the diffuser element can be composed of a material that can transition from translucent to transparent or vice-versa at a rate of up to 300 Hz.

As used herein, a "scatter state" refers to a state of an object that scatters light. When an object scatters light, such as a milky liquid or frosted glass, the light passing through is deflected over a lobe of angles (i.e., making the object translucent). This has the effect of blurring objects seen through the scattering medium. Light shining onto a scattering medium can make it look like a bright white glowing object, whose color does not change based on the direction of view. This makes it suitable for use as a backlight for a display.

As used herein, "transparent" refers to a state of an object that passes all (nearly all) light (without blur or attenuation). "Semi-transparent" may refer to a state of an object that passes a subset of the visible light such that an observer can perceive some light passing through the object (e.g., a change in brightness while not blurring the view of objects seen through it). Accordingly, an object in a semi-transparent state passes less light than the same object in a transparent state. "Opaque" refers to a state of an object that blocks (all or nearly all) visible light (e.g., such that an observer cannot perceive an image through the object).

The transparency of an object may depend on the wavelength of the light, attenuating some colors more than others. Red tinted glass, for instance, allows through red light while blocking other colors. A liquid crystal display controls the transparency of pixels for red, green and blue bands of light, using adjacent regions with red, green and blur filters respectively. The digital content overlay system allows pixels to be displayed that have controllable emissive (or added) light, along with controlled transparency. Both the emitted color, and the transparency are controllable at each pixel for R, G, and B independently, or for other color bands for displays based on different color filters.

As shown in FIG. 2, the example environment 200 includes a diffuser direct light source 206 and an ambient light source 208. As used herein, the term "diffuser direct light source" refers to a light source that a display screen utilizes to display an emitted light image. In particular, a diffuser direct light source includes a light source located behind a display screen. A diffuser direct light source can refer to a directional light that shines onto a diffuser element and that is unobstructed by other objects (e.g., objects within a display case). As an alternative, the diffuser direct light source may refer to a sheet of material that is controllably emissive. The digital content overlay system in these embodiments could use a diffuser direct light source in the form of a uniform backlight that is mostly transparent, but coated or containing a light emitting material, such as an organic light emitting diode, to illuminate a display screen directly. For example, the diffuser direct light source could be a transparent backlight made of material that fluoresces when suitably illuminated externally or that glows when edge-lit. An alternative design is to combine the diffuser direct light source with a diffuser (e.g., the diffuser element 204), with the light source used to illuminate the diffuser directly. When illuminated in this way, and in a scattering state, the diffuser may act as a backlight for the transmissive display. Using a diffuser direct light source to illuminate a diffuser can help to ensure a wide angle of spread of light before the light reaches the display, enabling a wide viewing angle for any emissive function of the display.

As also used herein, the term "ambient light source" refers to a light source projecting light within a display case. In particular, the term ambient light source includes a light source projecting light to an internal cavity of a display case housing. Indeed, though not illustrated in FIG. 2, the ambient light source 208 can be located within the display housing 101. For example, an ambient light source may include a light source that produces and provides light from behind the diffuser element 204 and that projects light in a direction toward the display screen 202 either directly or after reflecting off objects in the display case.

As illustrated in FIG. 2, the digital content overlay system sets the ambient light source 208 in an on state to illuminate the objects behind the display screen 202 seen through the diffuser element 204. In particular, the digital content overlay system sets the ambient light source 208 in an on state with the diffuser direct light source 206 set in an off state. As shown, the light 210 from within the internal cavity of the display housing 101 (indicated by the arrows of FIG. 2 that represent light waves), emanates in a direction out from the ambient light source 208, through the diffuser element 204, and through the display screen 202. As also shown, some of the light 210 is selectively attenuated by the display screen 202 (as shown by the decrease in length of the arrows after passing through the display screen 202) to display a background view modulated by a transparency mask image. In some embodiments, however, the display screen 202 does not filter any light 210 in the attenuating state. For an LCD screen, however, at least half of the light 210 is typically blocked by the various layers of the LCD screen, even in a state of maximum transparency. To overcome this loss of brightness for tangible objects within a display case, the digital content overlay system may brighten the ambient light 210.

As illustrated in FIG. 2, the digital content overlay system sets the display screen 202 in an attenuating state and sets the diffuser element 204 in a transparent state. Therefore, the diffuser element 204 does not scatter the light 210 as it passes through the diffuser element 204, and the display screen 202 selectively attenuates the light 210. Accordingly, much of the light 210 passes through the diffuser element 204 and the display screen 202 to reveal an image of the interior of the display housing 101.

FIG. 3, as mentioned above, illustrates an environment 300 including the display screen 202, the diffuser element 204, the diffuser direct light source 206, and the ambient light source 208. In particular, FIG. 3 illustrates the display screen 202 in an emissive state, the diffuser element 204 in a scatter state, a diffuser direct light source 206 in an on state, and the ambient light source 208 in an off state. The digital content overlay system sets the ambient light source 208 to the off state and does not project any light outward toward the diffuser element 204. Even so, as shown in FIG. 3, the diffuser element 204 blocks (e.g., scatters) the light 210 that emanates from within the internal cavity of the display housing 101. Thus, the diffuser element 204 obstructs an image of the interior of the display housing 101, including the object 104, from projecting through the display screen 202 and being visible to an observer.

In addition, the digital content overlay system sets the diffuser direct light source 206 to an on state to produce or emit the light 212 (illustrated by the arrows in FIG. 3). The light 212 from the diffuser direct light source 206 projects outward toward the diffuser element 204. In particular, the light 212 projects from the diffuser direct light source 206 to illuminate the diffuser element 204 in the scatter state. Indeed, the diffuser element 204 scatters the light 212 that is projected onto it from behind, thereby blurring any image that would otherwise be visible through the diffuser element 204 in the transparent state and producing an even glow of light (e.g., white light) across the diffuser element 204. As a result, by scattering the light 212 in this way, the diffuser element 204 provides an emitted light for the display screen 202 to produce an emitted light image. As shown, the diffuser element 204 scatters the light 212 to produce cones of rays that project toward the display screen 202. Thus, the diffuser element 204 acts as a backlight for the display screen 202 when in the scatter state.

As mentioned, the diffuser direct light source 206 provides light 212 evenly across the diffuser element 204 to provide a uniform picture to an observer looking at the display screen backlit by the diffuser element 204. Additionally, in some embodiments the diffuser direct light source 206 provides a white light that includes all wavelengths of visible light. In FIG. 3, the digital content overlay system sets the display screen 202 in the emissive state and filters some of the light 212 projected by the diffuser direct light source 206 onto the diffuser element 204. For example, the display screen 202 attenuates select wavelengths from the light 212 to display digital content (e.g., the emitted light image of FIG. 1B).

Different areas of the display screen 202 can filter different wavelengths of the light 212 to display different colors as part of an image, icon, text, etc. Similarly, some areas of the display screen 202 may not filter any wavelengths of the light 212, but may instead pass the light 212 through the display screen 202 to display all wavelengths produced by the diffuser direct light source 206 illuminating the diffuser element 204 (e.g., to show the color white). As illustrated in FIG. 3, the display screen 202 filters the light 212 (e.g., to display at least part of a digital overlay as shown by the emitted light image in FIG. 1B).

Although FIGS. 2-3 illustrate a particular arrangement of the display screen 202, the diffuser element 204, the diffuser direct light source 206, and the ambient light source 208, additional arrangements are possible. For example, in some embodiments the diffuser direct light source may be a transparent material with a controllable glow such as a transparent organic light emitting diode ("OLED") or grid of OLEDs. In these embodiments, the diffuser direct light source may have the same height and width as the diffuser element 204 and may be located directly behind (e.g., toward the inside of a display case) and/or affixed to the diffuser element 204. Additional detail regarding alternative embodiments of the display case is provided below with reference to FIG. 7.

Although FIGS. 2-3 illustrate the diffuser direct light source 206 as separate from the diffuser element 204, in some embodiments the diffuser element 204 may include the diffuser direct light source 206. For instance, the diffuser element 204 may include a light source on one face (e.g., a face that is in a direction toward the ambient light source 208) and a switchable diffuser on an opposite face (e.g., a face that is in a direction toward the display screen 202). Accordingly, the diffuser element 204 may be capable of alternating between a transparent state wherein the diffuser element 204 passes light (while the diffuser direct light source is off), and a scatter state wherein the diffuser element 204 scatters light from within the display housing 101 and also emits light outward toward the display screen 202.

In addition, although FIGS. 2-3 illustrate embodiments where the ambient light source 208 alternates between an on state (e.g., FIG. 2) and an off state (e.g., FIG. 3), in some embodiments the digital content overlay system maintains the ambient light source 208 in an on state. In particular, regardless of the state of the other components of the display case 100, the digital content overlay system may keep the ambient light source 208 in an on state to project light. In these embodiments, the diffuser element 204 scatters the light from the ambient light source 208 when the diffuser element 204 is translucent in the scatter state. In addition, the diffuser element 204 passes the light from the ambient light source 208 when the diffuser element 204 is transparent.

As mentioned above, in one or more embodiments the digital content overlay system synchronizes components of a display case and toggles states of the components based on a display rate. In particular, the digital content overlay system can toggle component states at a frequency that is faster than the human eye can perceive. Accordingly, the digital content overlay system can display contents within a display case (e.g., the object 104) together with a digital overlay (e.g., the digital overlay 106 of FIG. 1C). To describe the toggling of states between a first point in time wherein the digital overlay is visible and a second point in time wherein the interior of the display housing 101 is visible, FIG. 4 illustrates a flow 400 with "Time 1" and "Time 2" depicting the respective states of the components of the display case 100.

In particular, the flow 400 includes a display rate clock 402 which toggles the components (e.g., the display screen, the diffuser direct light source, the diffuser, and the ambient light source) between their respective states at Time 1 and Time 2. As illustrated in FIG. 4, the display rate clock 402 repeats the toggling between Time 1 and Time 2 at a rate dictated by a refresh rate of the display screen element. For example, the display rate clock 402 may toggle between the states at Time 1 and Time 2 at a rate of up to 144 Hz. In the same or other embodiments, the display rate clock 402 toggles between Time 1 and Time 2 at a rate of more or less than 144 Hz (e.g. 300 Hz, 240 Hz, 120 Hz, 60 Hz, 30 Hz, etc.). Furthermore, the display rate clock 402 may toggle between Time 1 and Time 2 at a rate within a particular range (e.g., from 30 to 60 Hz, from 60 to 144 Hz, from 144 to 300 Hz, etc.). Thus, as described above, each of the components are in their respective states corresponding to Time 1 up to 150 times per second, and are likewise in their respective Time 2 states up to 150 times per second. Although particular, rates are described, additional (e.g., faster or slower) rates are possible.

Figure 4:
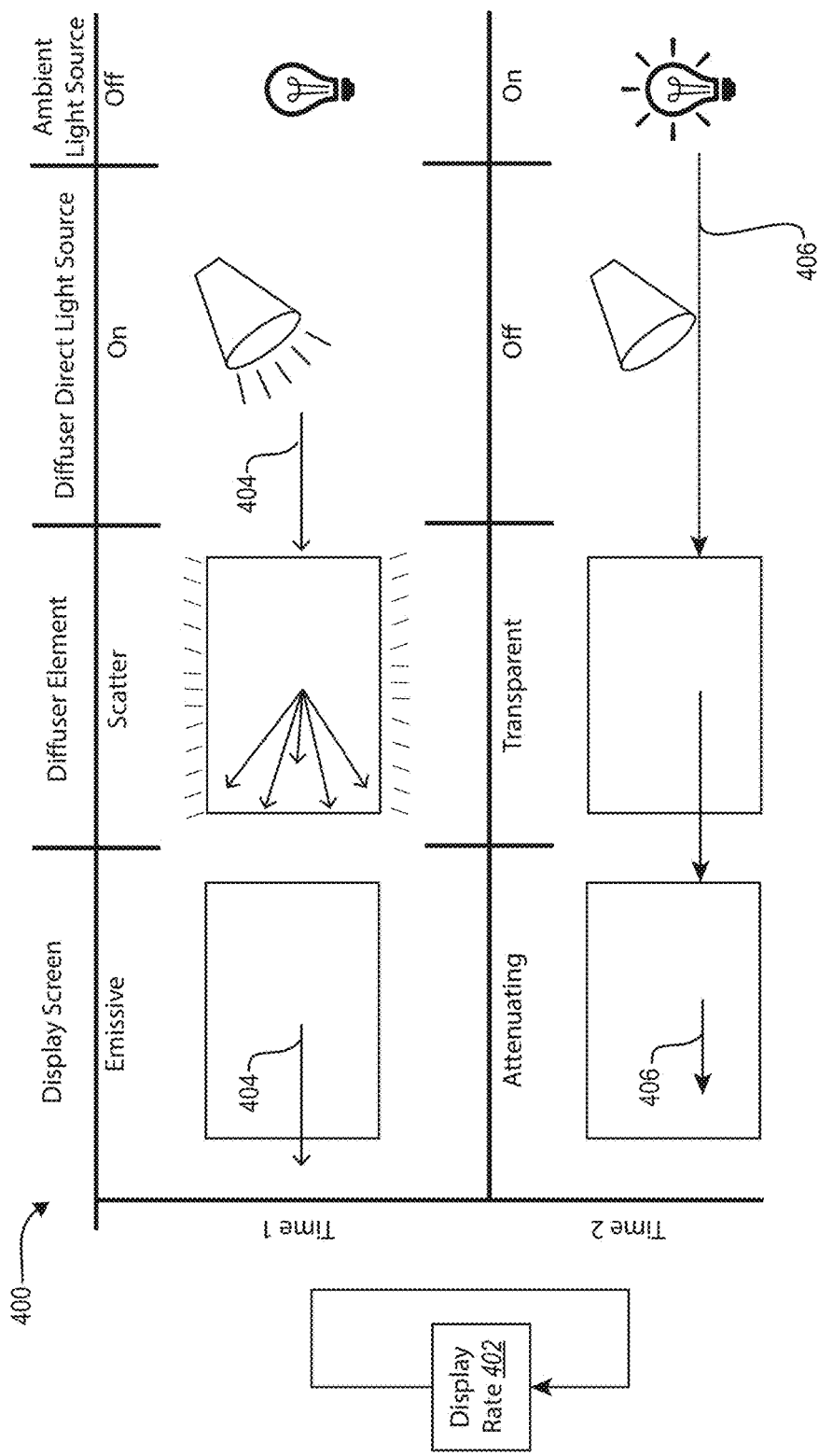
FIG. 4 illustrates an example flow diagram of various states associated with components of a display case in accordance with one or more embodiments.

As illustrated in FIG. 4, at Time 1 the digital content overlay system sets the display screen to an emissive state, the diffuser element to a scatter state, the diffuser direct light source to an on state, and the ambient light source to an off state. The diffuser direct light source projects light toward the diffuser element. For example, the diffuser direct light source projects a light wave 404 toward the diffuser element. Because the diffuser element is in the scatter state, the diffuser element scatters the light wave 404 to produce a cone of light rays, and the diffuser element glows evenly to emit light for the display screen. Thus, the display screen filters the light 404 that passes through it to display an emitted light image.

FIG. 4 also illustrates the states of the components at Time 2, where the digital content overlay system sets the display screen to an attenuating state, the diffuser element to a transparent state, the diffuser direct light source to an off state, and the ambient light source to an on state. By toggling the ambient light source on while the diffuser element is transparent, the digital content overlay system maintains consistent lighting. To illustrate, the digital content overlay system toggles the diffuser direct light source on during Time 1 and off during Time 2, and also toggles the ambient light source off during Time 1 and on during Time 2. Thus, whether at Time 1 or Time 2, the digital content overlay system enables a light source behind the display screen. This can help prevent an appearance of dimming the display when viewed in real time as the digital content overlay system quickly toggles the components of the display case 100 between states, and can further help increase the visibility of any tangible object (e.g., the object 104) contained within the display housing 101 of the display case 100.

As shown in FIG. 4, the ambient light source projects a light wave 406 outward through the transparent diffuser element and the display screen (which may selectively attenuate light to display a transparency mask image). Indeed, as shown in FIG. 4, the arrow representing light wave 406 is shorter when exiting the display screen to represent the attenuation of the light that passes through the display screen. Accordingly, an observer may perceive the light wave 406 (together with other light waves) to see the interior of the display housing 101 in addition to a transparency mask image, as illustrated above in FIG. 1A.

As mentioned above, the digital content overlay system synchronizes the components of the display case and toggles the components between states at Time 1 and Time 2. The digital content overlay system performs the toggling function according to the display rate (as illustrated by the display rate clock 402) described above. Thus, the digital content overlay system can present a digital overlay associated with the emitted light image and an object view modulated by the transparency mask image at Time 2 that appear together as a composite image to the human eye.

While FIG. 4 illustrates toggling between component states at an even ratio (e.g., equal amounts of time between an emissive state and an attenuating state) based on a display rate, in some embodiments the digital content overlay system toggles between component states at a different ratio. Indeed, the ratio or fraction of time for which the display screen (and other components) is in each respective state controls the overall brightness of each of the emitted light image and the transparency mask image within the composite image.

For example, the digital content overlay system may change the ratio between the states at Time 1 and the states at Time 2 to something other than a one-to-one correspondence. In particular, Time 1 may represent a number of consecutive frames (e.g., display rate cycles) that the digital content overlay system maintains the state of each component at its respective state at Time 1. For instance, the digital content overlay system may maintain the Time 1 states for two, three, four, etc. consecutive display rate cycles without toggling to the Time 2 states. Likewise, Time 2 may represent a number of consecutive frames that the digital content overlay system maintains the state of each component at its respective state at Time 2. For example, the digital content overlay system may maintain the Time 2 states for two, three, four, etc., consecutive display rate cycles.

In this manner, the digital content overlay system can vary the ratio (e.g., duty cycle) between component states. To illustrate a 2:3 ratio, the digital content overlay system may maintain the Time 1 states for two consecutive frames based on the display rate, then the digital content overlay system can toggle the components to the Time 2 states and maintain the Time 2 states for three consecutive frames based on the display rate. In addition to the 2:3 ratio in the foregoing example, the digital content overlay system can utilize a 1:2 ratio, a 3:5 ratio, a 4:5 ratio, or vice versa (e.g., 3:2, 2:1, 5:3, or 5:4).

Figure 5:
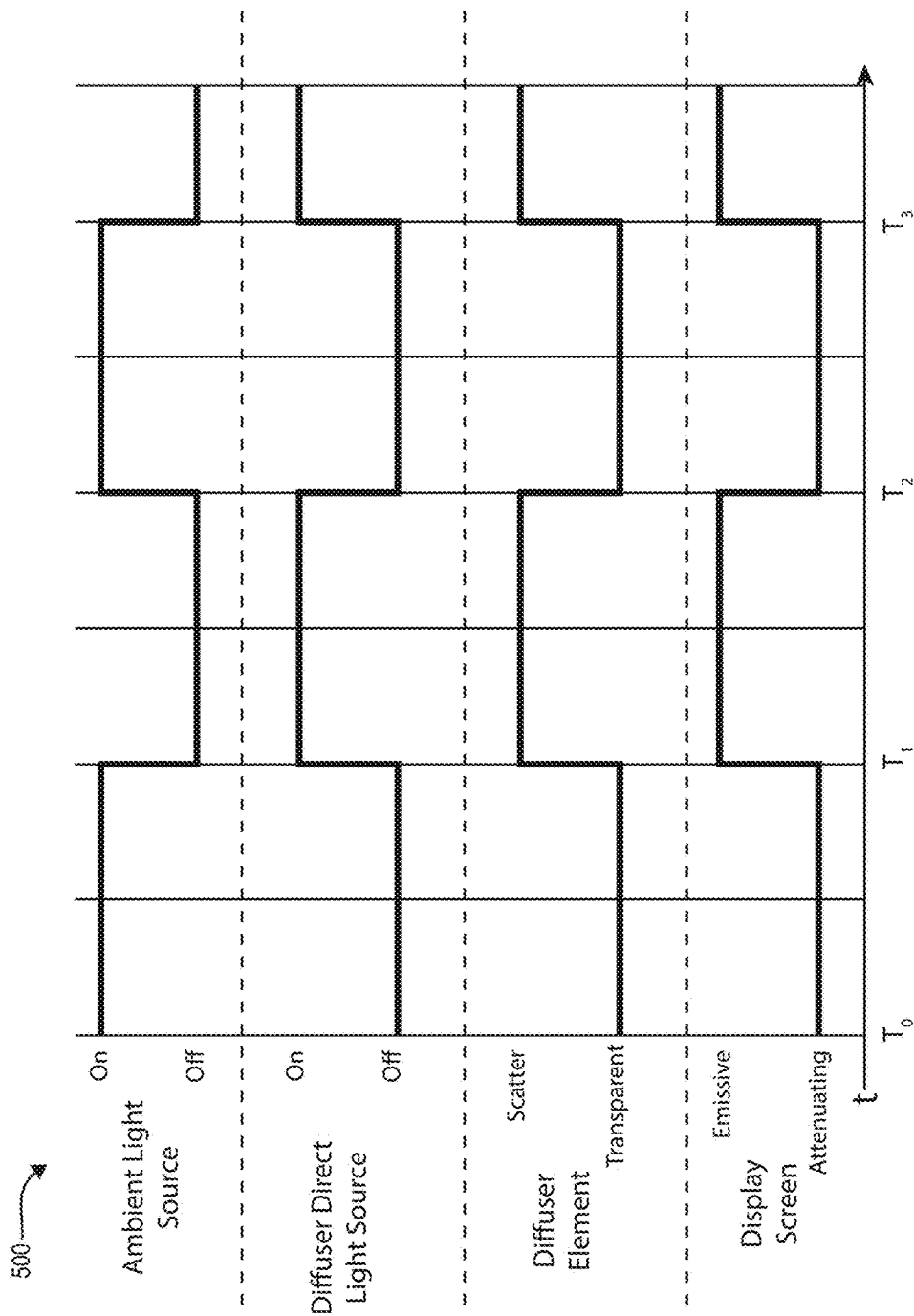
FIG. 5 illustrates an example timing diagram of state changes for components of a display case in accordance with one or more embodiments.

As just mentioned, the digital content overlay system can repeatedly toggle components between various states at various times. FIG. 5 illustrates a timing diagram 500 for modifying states of various components in accordance with one or more embodiments. In particular, the timing diagram 500 includes a timing associated with the display screen, a timing associated with the diffuser element, a timing associated with the diffuser direct light source, and a timing associated with the ambient light source. Indeed, as illustrated in FIG. 5, the digital content overlay system synchronizes each of the components of the display case 100 based on a display rate that is indicated by the transitions occurring along the time axis t.

To illustrate the timing of alternating between states (e.g., the attenuating state and the emissive state), the time axis t can include discrete times T0, T1, T2, and T3, distributed at even intervals along the time axis t. From T0 to T1, for example, the digital content overlay system sets the display screen to an attenuating state while setting the diffuser element to a transparent state, the diffuser direct light source to an off state, and the ambient light source to an on state. Conversely, from T1 to T2, the digital content overlay system sets the display screen to an emissive state while setting the diffuser direct light source to an on state, the diffuser element to a scatter state, and the ambient light source to an off state.

For a display rate of 144 Hz, the time between T0 and T1 (which is the same as the interval between T1 and T2 or between T2 and T3) is 6.94 milliseconds (rounded to two significant figures). Similarly, for a display rate of 120 Hz (which, like 144 Hz, is the refresh rate of some commercial monitors), the time interval between T0 and T1 is 8.33 milliseconds. Accordingly, based on a display rate of 144 Hz, the digital content overlay system toggles (e.g., switches the state of) each of the display screen, the diffuser element, the diffuser direct light source, and the ambient light source once every 6.94 milliseconds. Similarly, for 120 Hz, the digital content overlay system toggles the states every 8.33 milliseconds.

While FIG. 5 illustrates only two states for each of the components of the digital content overlay system, in some embodiments additional states are possible (such as a third state and/or a fourth state). For example, in some embodiments the digital content overlay system utilizes a third state to control for translucency of a digital overlay. To illustrate, in one or more embodiments, the diffuser element is controllable on a pixel level. Specifically, the diffuser element may be locally controllable on a pixel-by-pixel basis where individual pixels (or groups of pixels) can be in a scatter state while other pixels are in a transparent state (thus creating a translucency image). Accordingly, the digital content overlay system can toggle the diffuser element using a third state in addition to the scatter state and the transparent state—i.e., a localized translucency state. Thus, by utilizing the localized translucency state, the digital content overlay system can change a level of blur to provide a frosted glass-type overlay by adjusting an amount of scattering done by the diffuser element on a pixel-by-pixel basis. In particular, the digital content overlay system can control transparency based on a transparency mask image (in a first state), can control color based on an emitted light image (in a second state), and can control translucency based on a translucency image (in a third state).

In other embodiments, the digital content overlay system may utilize a uniform diffuser (i.e., a diffuser element not selectively controllable on a pixel level) with a third state. To illustrate, in these embodiments the digital content overlay system alternates the display screen between an emissive state (e.g., with the diffuser element in the scattering state, the diffuser direct light source in the on state, and the ambient light source in the off state), a translucent state (with the diffuser element in the scattering state, the diffuser direct light source in the off state, and the ambient light source in the on state), and a transparent state (with the diffuser element in the transparent state, the diffuser direct light source in the off state, and the ambient light source in the on state). Utilizing these three states, the digital content overlay system can utilize a uniform diffuser to create the appearance of a locally controllable translucency overlay combined with an independently controlled emissive overlay. To prevent perceptible flicker in such three-state embodiments, the digital content overlay system can utilize a display screen capable of a refresh rate of at least 180 Hz, for an interleaved update rate of at least 60 Hz.

Figure 6:
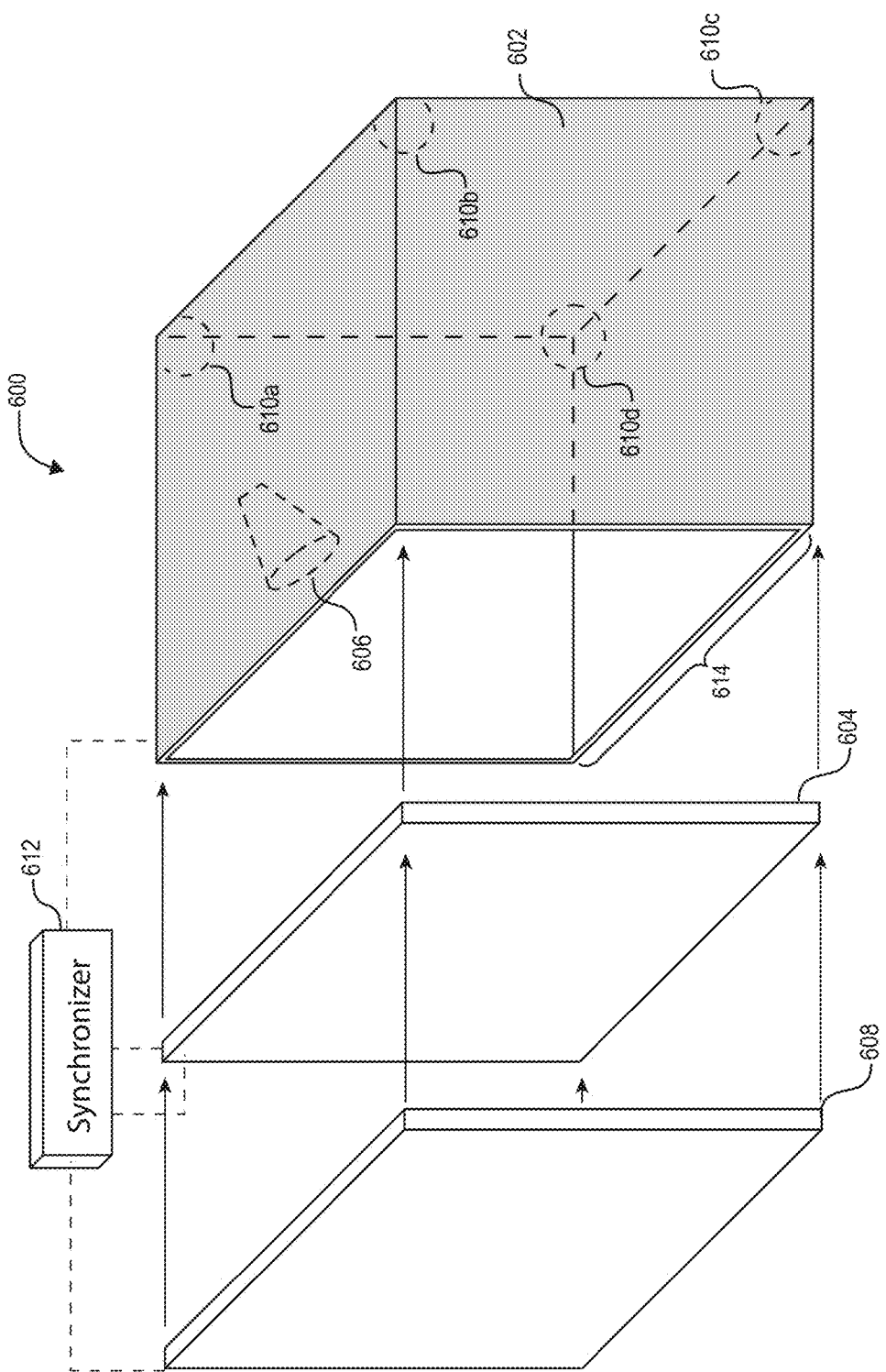
FIG. 6 illustrates an example display case including one or more components in accordance with one or more embodiments.
Figure 7:
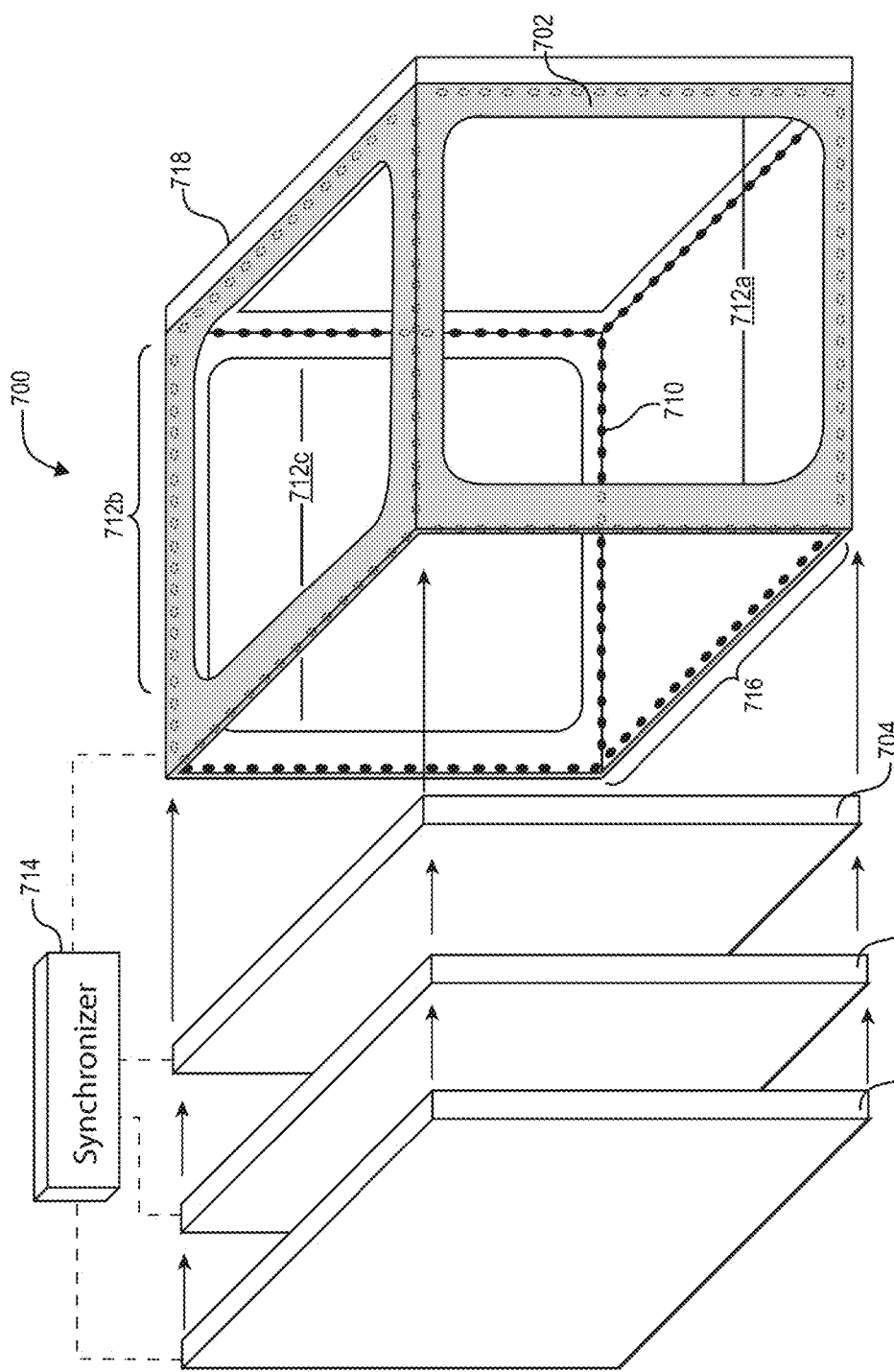
FIG. 7 illustrates another example display case including one or more components in accordance with one or more embodiments.

As described above, the digital content overlay system synchronizes the components of a display case to present a view of a tangible object within the display case together with a digital overlay. For example, FIGS. 6 and 7 illustrate components of exemplary display cases in accordance with one or more embodiments. Indeed, FIG. 6 illustrates a display case 600 including a display housing 602, a diffuser element 604, a diffuser direct light source 606, a display screen 608, ambient light sources 610a-610d (referred to herein collectively as "ambient light sources 610"), and synchronizer 612. Likewise, FIG. 7 illustrates a display case 700 including a display housing 702, a diffuser direct light source 704, a diffuser element 706, a display screen 708, an ambient light source 710, and a synchronizer 714.

Although not shown in FIGS. 6 and 7, the display case 600 and/or 700 may include communication devices such as USB, WI-FI, BLUETOOTH, radio frequency identification ("RFID"), near field communication ("NFC"), or some other radio frequency transceiver. In particular, the display case may communicate with a user client device (e.g., a smartphone, tablet, computer, etc.) by way of such a communication device. For example, the display case can receive digital content for a digital overlay by way of the communication device. The display case can further receive instructions to adjust the display rate, adjust opacity, change colors of the ambient light source and/or the diffuser direct light source, change between a setting where the ambient light source toggles on and off and a setting where the ambient light source stays on (or off), and/or adjust other settings.

While FIGS. 6 and 7 illustrate an expanded view of the display cases 600 and 700 (i.e., with the various components separated for purposes of explanation), the arrows of FIGS. 6 and 7 indicate that the components of the display cases 600 and 700 may fit together as a single body.

As illustrated in FIG. 6, the display case 600 includes a display housing 602. The display housing 602 may be cubic in shape or else may be a rectangular prism in shape. Additionally, the display housing 602 may be composed of a number of (e.g., five) walls and an open face 614. The diffuser element 604 and the display screen 608 may cover the open face 614 of the display housing 602. In addition, the display housing 602 may have an internal cavity surrounded by the display housing 602 (e.g., the internal cavity enclosed by the walls that make up the display housing 602). Accordingly, the display housing 602 may hold one or more tangible objects within the internal cavity of the display housing 602. In addition, the diffuser element 604 and/or the display screen 608 may insert into the open face 614 and may be removable from the open face 614. In the same or other embodiments, the display housing 602 may include one or more hinged walls that open for access to the internal cavity within the display housing 602. Alternatively, the display housing 602 may include one or more removable walls that remove for access to the internal cavity within the display housing 602. Moreover, the display housing 602 may include one or more openings in one or more walls to provide access to the internal cavity.

Within the display housing 602, the display case 600 further includes ambient light sources 610. As illustrated in FIG. 6, the ambient light sources 610 are located in each of the four corners that are most distal from the diffuser element 604. Indeed, the ambient lights 610 are affixed to the inside of the walls of the display housing 602 opposite the open face 614. Additionally, the walls of the display housing 602 may be reflective or may be a particular color (e.g., white) to enhance visibility inside the internal cavity of the display housing 602.

While FIG. 6 illustrates the ambient light sources 610 in particular locations, the ambient light sources 610 may be located in alternative or additional locations. For example, in some embodiments the ambient light sources 610 are located in the four corners within the display housing 602 that are most proximal to the diffuser element 604. In still other embodiments, there may be more or fewer ambient light sources 610. For instance, there may be a single ambient light source 610 located centrally inside the top wall or else centrally inside the bottom wall of the display housing 602.

The diffuser element 604 of FIG. 6 is located over the open face 614 of the display housing 602. Alternatively, the diffuser element 604 can be secured within the display housing 602 between (and/or affixed to) the display screen 608 and the internal cavity of the display housing 602. In particular, the diffuser element 604 is sized to match the display housing 602 such that the diffuser element 604 covers the open face 614 of the display housing 602. Indeed, while FIG. 6 illustrates the open face 614 as rectangular, in some embodiments the open face 614 of the display housing 602 is some other shape (e.g., circular, triangular, etc.). Additionally, in some embodiments the open face 614 may have an area less than the area of a given side of the display housing 602. In these embodiments, the open face 614 may be an opening in a wall of the display housing 602. As illustrated in FIG. 6, the diffuser element 604 fits over the open face 614 to cover the open face 614 of the display housing 602.

The display housing 602 can include a diffuser direct light source 606 located within the display housing 602. In particular, the diffuser direct light source 606 can be located on the inside of an upper wall of the display housing 602 or in some other location to be unobstructed by any objects within the display housing 602. Further, the diffuser direct light source 606 may be an LED light source, a fluorescent light source, or some other type of light source that emits a white light directionally toward the diffuser element 604.

Accordingly, the diffuser direct light source 606 is positioned to project light in a clear path evenly onto the diffuser element 604. In some embodiments, the diffuser direct light source 606 produces white light that includes all or most of the wavelengths of the visible light spectrum. In other embodiments, the diffuser direct light source 606 produces light that includes only a subset of all of the wavelengths of visible light (e.g., light of a particular color).

As further illustrated in FIG. 6, the display screen includes a display screen 608. As described above, the display screen 608 can be any appropriate display panel capable of performing the functions described herein. The display screen 608 and the diffuser element 604 are matched in size so that the diffuser element 604 can scatter light before the light passes through to the display screen 608. Furthermore, in some embodiments, the display screen 608 and the diffuser element 604 are affixed together to form a display assembly.

As just mentioned, the display screen 608 and the diffuser element 604 may be connected to form a display assembly. Within the display assembly, the display screen 608 may form one face of the display assembly, and the diffuser element 604 may form the opposite face of the display assembly. While FIG. 6 illustrates a display assembly including only a display screen 608 and a diffuser element 604, in some embodiments (e.g., where the diffuser direct light source is a transparent OLED or grid of OLEDs) a display assembly can further include a diffuser direct light source located on the side of the diffuser element 604 opposite the display screen 608. Furthermore, while FIG. 6 illustrates the display assembly located on a particular face of the display housing 101, in some embodiments the display assembly is located on a different face. Similarly, although FIG. 6 illustrates a single display assembly, in some embodiments the display case 100 includes more than one display assembly (e.g., the display case 100 may include a display assembly on two, three, four, or five faces of the display housing 602).

As further illustrated in FIG. 6, the display case 600 includes a processor or some other computing device such as, but not necessarily limited to, a synchronizer 612. In particular, the synchronizer 612 synchronizes the various components of the display case 600 such as the diffuser element 604, the diffuser direct light source 606, the display screen 608, and the ambient light sources 610. To illustrate, the synchronizer 612 may include an adjustable clock that can be set to a display rate, such as 144 Hz, or some other frequency. Based on the display rate, the synchronizer 612 triggers state changes in one or more of the components of the display case 600. For instance, the synchronizer 612 triggers the diffuser element 604 to change from a transparent state to a scatter state while also triggering the display screen 608 to change from an attenuating state to an emissive state, the diffuser direct light source 606 to change from an off state to an on state, and the ambient light sources 610 to change from an on state to an off state, as described above.

In some embodiments, the synchronizer 612 can include a graphical processing unit ("GPU") or some other processor to detect a refresh rate associated with the display screen 608. Based on the refresh rate of the display screen 608, the synchronizer 612 may adjust the display rate and may time the triggering of state changes for each of the components of the display case 600 accordingly. For example, some commercial monitors have a refresh rate of 144 Hz. In the cases where the display screen 608 has a refresh rate of 144 Hz, the synchronizer sets the display rate (e.g., automatically without user input or in response to user input to manually set the display rate) to and initiates the state changes of the diffuser element 604, the diffuser direct light source 606, and/or the ambient light sources 610. Indeed, in some embodiments, the display screen 608 transitions between an emissive state and an attenuating state based on its refresh rate, and does so automatically without additional user input. Likewise, the synchronizer 612 sets the display rate for refresh rates of other frequencies as well, as described above with reference to the previous figures.

While FIG. 6 illustrates a particular example embodiment of the display case 600, additional or alternative embodiments are possible. For example, the display case 600 can include an additional processor or other computing device. The processor may be capable of rendering, rasterizing, or presenting digital content by way of a display screen, and the processor may be further capable of communicating with a user client device by way of a WI-FI device or other communication device to receive digital content and/or instructions to adjust the display rate or other settings. As another example, FIG. 7 illustrates an embodiment of the display case 700.

As shown in FIG. 7, the display case 700 includes a display housing 702 that differs from the display housing 602 of FIG. 6. In particular, some the walls of the display housing 702 have holes or openings 712a-712c (referred to herein collectively as "openings 712") whereby the internal cavity within the display housing 702 is accessible. The display housing 702 may also include an open face 716. While FIG. 7 illustrates a particular number of openings 712 having a particular size and shape in the display housing 702, in some embodiments the display housing 702 may have more or fewer openings 712, and the openings 712 may be a different size and shape (e.g., circular, ovular, triangular, or rectangular).

For example, in some embodiments the display housing 702 includes only a single opening through the top wall of the display housing. In other embodiments, the display housing 702 includes more than one opening on a single face of the display housing 101. For example, the display housing can include two circular holes on the top face in addition to, or alternatively to, a rectangular opening (e.g., with or without rounded corners) on a different face of the display housing 101.

In addition, although FIG. 7 illustrates the display housing 702 having a particular shape, in some embodiments the display housing 702 may be a different shape. For example, the display housing 702 may not be a box shape with sharp corners, but may instead have rounded corners. As another example, the display housing may be spherical or curved in shape (e.g., an egg shape or a football shape). In such embodiments, the diffuser direct light source 704, the diffuser element 706, and the display screen 708 may also be curved to fit the shape of the display housing 702. The display housing 702 may alternatively be a trapezoidal prism, a pyramid, or some other feasible shape.

As illustrated in FIG. 7, the display housing 702 includes an ambient light source 710. In particular, the ambient light source 710 is composed of a lighting strip (e.g., an LED strip) affixed along the seams of the walls inside the display housing 702. In some embodiments, the ambient light source 710 is located in additional or alternative locations. For example, the ambient light source 710 may run along only some of the seams within the display housing 702 (e.g., only the seams along the open face 716 or seams along a wall opposite the open face 716) and may consist of a higher or lesser density (e.g., three per inch, five per inch, one per inch) of LEDs (or other light). As shown in FIG. 7, the ambient light source 710 illuminates the internal cavity of the display housing 702 and projects light out through the open face 716 (e.g., the open face over which the diffuser direct light source 704 is located).

As described herein, the ambient light source 710 (or 610) and the diffuser direct light source 706 (or 606) may project similarly colored light. For example, the ambient light source 710 and the diffuser direct light source 704 may project light that shares the same wavelengths (e.g., the same or similar color of white). In other embodiments, the ambient light source 710 and the diffuser direct light source 704 project light of different colors (e.g., that have different wavelengths of light).

Although not illustrated in FIG. 7, in some embodiments the display case 700 may not include an ambient light source 710 and may instead rely on any natural lighting within the display housing 101 to illuminate an object (e.g., object 104) contained therein (e.g., during those times where the diffuser element 706 is in the transparent state, as described above). In other embodiments, the display case 100 may not toggle the ambient light source 710 between states, and may instead maintain the ambient light source in an on state irrespective of the states of the diffuser direct light source 704, the diffuser element 706, and/or the display screen 708.

As just mentioned, the display case 700 of FIG. 7 further includes a diffuser element 706. In particular, the diffuser element 704 may be affixed to (or be otherwise located in or on) an open face of the display housing 702. The diffuser element 704 may also vary in thickness. For example, although FIG. 7 illustrates the diffuser direct light source 704, the diffuser element 706, and the display screen 708 with similar thicknesses, the diffuser element may be thicker or thinner than the diffuser direct light source 704 and/or the display screen 708. Depending on the composition of the diffuser element 706, the diffuser element 706 may be a fraction of the thickness of the display screen 708. In other embodiments, however, the display case 700 can include more than one diffuser element 706 stacked (e.g., layered) together to achieve a desired opacity.

Additionally, the diffuser element 706 may vary in its opacity. To elaborate, the diffuser element 706 may be variable based on user input to set an opacity of the diffuser element 706. Thus, in circumstances where a user wants to achieve a particular visual effect by alternating the diffuser element 706 between a transparent state and a particular scatter state (e.g., a particular translucence), the diffuser element 706 may be capable of such state changes.

As further illustrated in FIG. 7, the display case 700 also includes a diffuser direct light source 704. Differing from the diffuser direct light source 606 of FIG. 6, the diffuser direct light source 704 has a panel-shaped form. For instance, the diffuser direct light source 606 may be transparent grid of OLEDs, as described above. In some embodiments, the diffuser direct light source 704 is a transparent material that produces light and projects light toward the display screen 708 by fluorescing when externally illuminated by glowing when edge-lit. Furthermore, the diffuser direct light source 704 may attach (e.g., be affixed) to the diffuser element 706 and/or the display screen 708, as also described above.

FIG. 7 further illustrates the display case 700 including a display screen 708. The display screen 708 filters light that illuminates the diffuser element 706 from the diffuser direct light source 704. However, in some embodiments, the display screen 708 does not filter light from the diffuser direct light source 704 and instead only filters light provided by the ambient light source 710. Indeed, although FIG. 7 illustrates the diffuser direct light source 704, in some embodiments the display case 700 does not include a diffuser direct light source 704. Additionally, the display screen 708 may be a touchscreen and may therefore be able to receive user input.

Alternatively, the diffuser direct light source 704 could be placed adjacent to the display screen 708. In these embodiments, the diffuser element 706 would be used to blur the view of the background objects (e.g., tangible objects within the display case 700) seen when the display screen 708 is in the emissive state. In other embodiments, the display case 700 does not include a diffuser element 706. Thus, the emissive state of the display screen 708 may be driven by the diffuser direct light source 704. In these embodiments, bright emissive regions may also display a partial view of the background objects. However, the digital content overlay system can reduce the fraction of time in the emissive state to keep it relatively short, thereby minimizing this effect.

Furthermore, the display case 700 can include one or more additional display assemblies (e.g., assemblies including a display screen, a diffuser element, and optionally a diffuser direct light source) such as display assembly 718. As shown in FIG. 7, the display assembly 718 may cover another open face of the display case 700. Indeed, the display case 700 can include a display assembly for every open face of the display 700.

As mentioned above, the diffuser element 706 transitions between a transparent state and a scatter state—e.g., a state in which the diffuser element 706 passes light from the ambient light source 710 to illuminate the display screen 708. In particular, in a scatter state of the diffuser element 706, the ambient light source 710 may illuminate the diffuser element 706 (e.g., to glow white), but the diffuser element 706 may scatter light that passes through, blurring tangible objects or color images of the interior of the display case 100. Accordingly, the ambient light source 710 may not alternate between off and on, but remain in an on state. While in an on state, the ambient light source 710 can provide light which the display screen 708 filters to display a digital overlay (e.g., when the diffuser element 704 is in a scatter state). Moreover, the ambient light source 710 can provide an illuminated view of the interior of the display case 100 by way of the display screen 708 (e.g., when the diffuser element is in a transparent state).

FIG. 7 also illustrates the display case 700 including the synchronizer 714. In particular, the synchronizer 714 may function similarly to the synchronizer 612 described above in relation to FIG. 6. Although not illustrated in FIG. 7, the display case 700 can include an alternative display device to the display screen 708. For example, the display case 700 can include a projector that presents the digital overlay. Indeed, the projector may alternate between an active state and an inactive state as described above in relation to the display screen 102, 202, 608, and 708. In addition, the projector may be located within the display housing 702 at a location in one of the corners of the display housing 702. For instance, the projector may be affixed to the inside of one or more walls of the display housing 702, in a location that enables the projector to project an image via the open face of the display housing 702 without being obstructed by any tangible object contained within the display housing 702.

Figure 8:
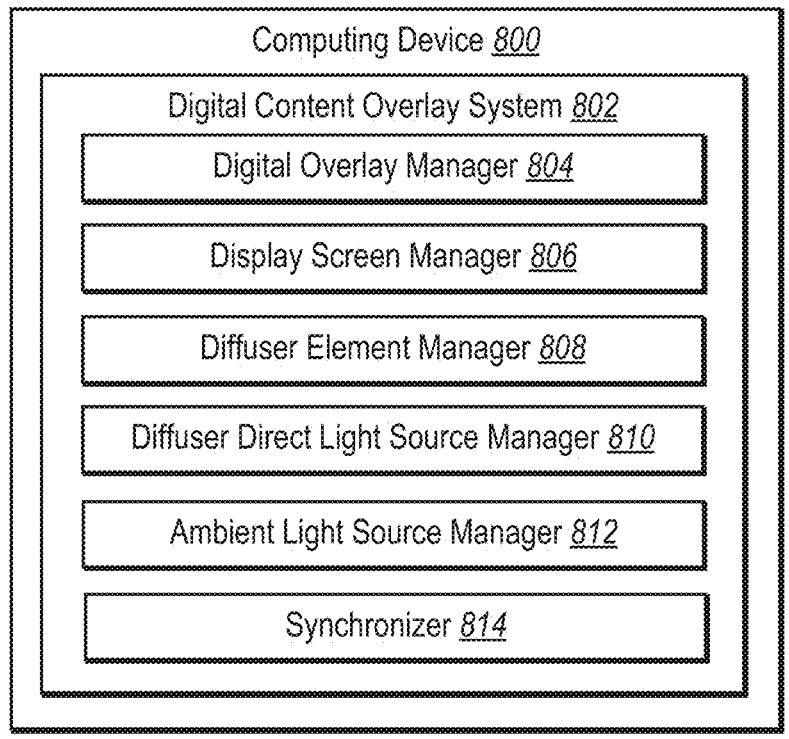
FIG. 8 illustrates an example schematic diagram of a digital content overlay system in accordance with one or more embodiments.

Looking now to FIG. 8, additional detail will be provided regarding components and capabilities of the digital content overlay system. Specifically, FIG. 8 illustrates an example schematic diagram of a digital content overlay system 802 on an example computing device 800 (e.g., the display case 100, 600, and/or 700). As shown in FIG. 8, the digital content overlay system 802 may include a digital overlay manager 804, a display screen manager 806, a diffuser element manager 808, a diffuser direct light source manager 810, an ambient light source manager 812, and a synchronizer 814. While FIG. 8 depicts a particular number of components, in some embodiments, the digital content overlay system 802 may include more or fewer components. In addition, the components may perform additional or alternative tasks than those described hereafter.

As mentioned, the digital content overlay system 802 includes a digital overlay manager 804. In particular, the digital overlay manager 804 manages, generates, animates, and/or creates digital content for display by way of a display screen. For example, the digital overlay manager 804 generates digital content (e.g., emitted light images and/or transparency mask images) including text, images, icons, etc., in response to user input to design the digital content. The digital overlay manager 804 may further generate digital content that appears to interact with a tangible real-world object that appears behind a display screen (e.g., within a display case). For instance, the digital overlay manager 804 may generate a digital animation of digital content that virtually interacts with an object on display within the display case (e.g., emitted light images and/or transparency mask images that when combined portray the digital overlay). As an example, the digital overlay manager 804 may animate a screw driving into a wall that appears to be driven by a real-world screwdriver on display within the display case.

As illustrated in FIG. 8, the digital content overlay system 802 also includes a display screen manager 806. In particular, the display screen manager 806 renders, rasterizes, presents, or otherwise displays digital content by way of a display screen (e.g., display screen 102, 202, 608, or 708). The display screen manager 806 also toggles, switches, alternates, or transitions the display screen between an emissive state and an attenuating state, as described above. In the emissive state, the display screen manager 806 activates the display screen to filter light to display digital content (e.g., an emitted light image). In the attenuating state, the display screen manager 806 changes the active areas (e.g., pixels) on the display screen to passively allow some light to travel through the display screen while selectively filtering other light to display a background view attenuated by a transparency mask image.

FIG. 8 further illustrates the digital content overlay system 802 including a diffuser element manager 808. In particular, the diffuser element manager 808 manages or controls a diffuser element (e.g., the diffuser element 204, 604, or 704). For example, the diffuser element manager 808 toggles, switches, alternates, or transitions the diffuser element from a scatter state to a transparent state and vice-versa. For example, the diffuser element manager 808 sends an electrical signal to stimulate molecules within the diffuser element to turn opaque or to turn transparent.

As further illustrated in FIG. 8, the digital content overlay system 802 includes a diffuser direct light source manager 810. In particular, the diffuser direct light source manager 810 manages or controls a diffuser direct light source (e.g., the diffuser direct light source 206, 606, or 704). For example, the diffuser direct light source manager 810 toggles, switches, alternates, or transitions the diffuser direct light source from an on state to an off state and vice-versa, in accordance with the disclosure herein.

FIG. 8 also illustrates the digital content overlay system 802 including an ambient light source manager 812. In particular, the ambient light source manager 812 manages or controls an ambient light source (e.g., the ambient light source 208, 610, or 710). For example, the ambient light source manager 812 toggles, switches, alternates, or transitions the ambient light source from an on state to an off state and vice-versa, in accordance with the disclosure herein.

As further illustrated in FIG. 8, the digital content overlay system 802 also includes a synchronizer 814. In particular, the synchronizer 814 communicates with one or more of the display screen manager 806, the diffuser element manager 808, the diffuser direct light source manager 810, and/or the ambient light source manager 812 to synchronize, time, trigger, align, or otherwise initiate the transitions of the display screen, the diffuser direct light source, the diffuser element, and/or the ambient light source, in accordance with the disclosure herein.

Figure 9:
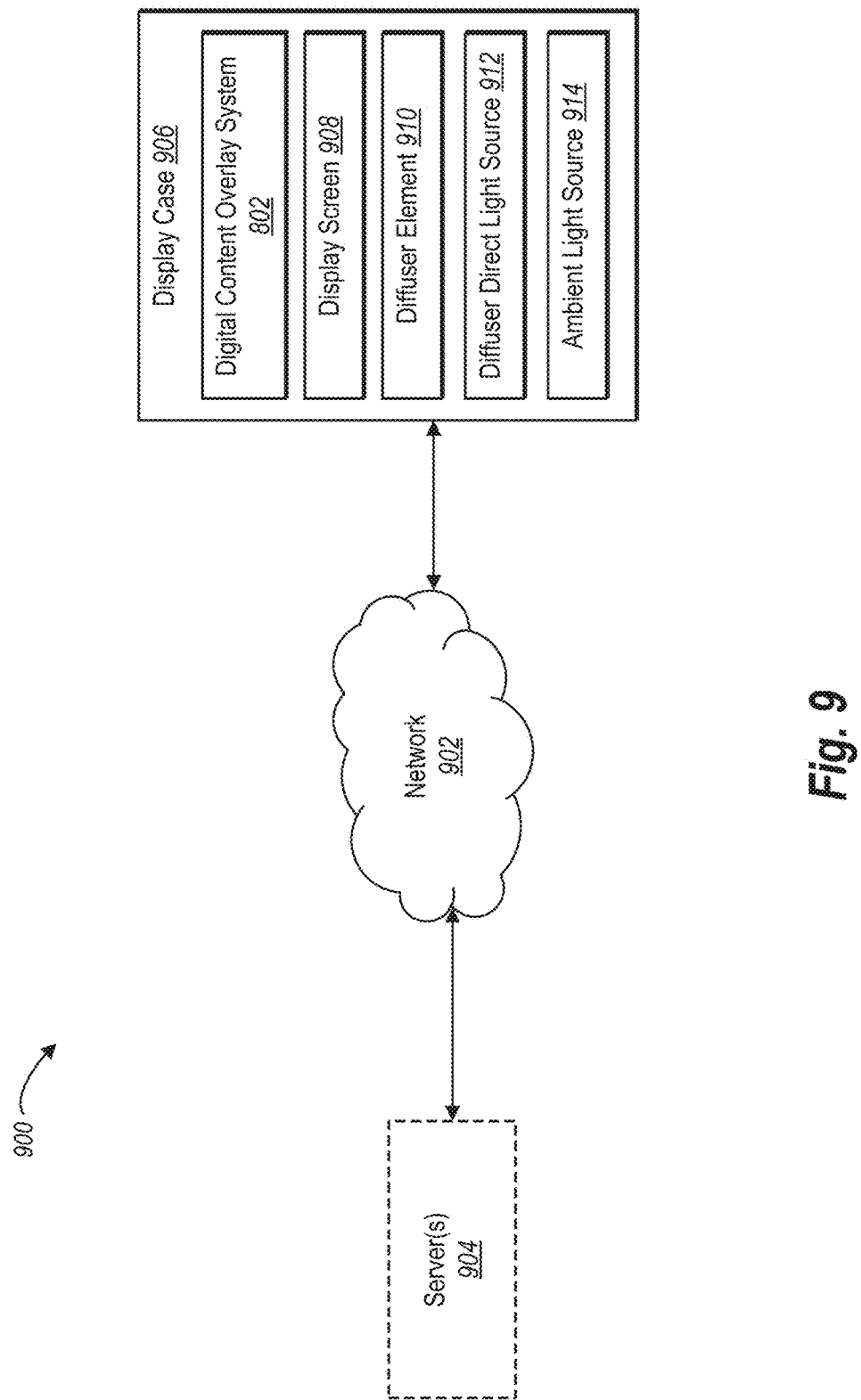
FIG. 9 illustrates an example environment in which the digital content overlay system operates in accordance with one or more embodiments.

FIG. 9 illustrates a schematic diagram of one embodiment of an exemplary environment 900 in which the digital content overlay system 802 operates. In one or more embodiments, the exemplary environment 900 includes a network 902, server(s) 904, and a display case 906 including the digital content overlay system 802, a display screen 908, a diffuser element 910, a diffuser direct light source 912, and an ambient light source 914. While FIG. 9 illustrates a particular arrangement of the components of the environment 900, the environment 900 may have additional or alternative arrangements.

As illustrated in FIG. 9, the environment 900 may include a network 902. In particular, the network 902 can interface the server(s) 904 and the display case 906. Accordingly, the network 902 can facilitate communications between the server(s) 904 and the display case 906 via appropriate network protocol. For example, the network 902 may refer to a local network (e.g., a local area network or "LAN") or a wide area network ("WAN") or may refer to different communication protocol by which two computing devices can communicate.

As also illustrated in FIG. 9, the environment 900 may include server(s) 904. The server(s) 904 may refer to one or more computing devices by which a user (e.g., an administrator) can create, arrange, and upload digital content for a digital overlay. In particular, the server(s) 904 can communicate, via network 902, with the digital content overlay system 802 on (e.g., housed within) the display case 906. Accordingly, the server(s) 904 can communicate with the digital content overlay system 802 to provide, send, or otherwise transmit data, including digital content for a digital overlay, user settings for a display rate, brightness settings (e.g., for the diffuser direct light source 912 and/or the ambient light source 914), etc.

In some embodiments, the environment 900 does not include the server(s) 904. In these embodiments, the digital content overlay system 802 can receive user input (e.g., via a user input device such as a keyboard, keypad, touchscreen, etc.) directly. Accordingly, the digital content overlay system 802 can transmit digital content for a digital overlay to the display screen 908, and can further transmit display rate settings, opacity settings, brightness settings, etc., to the other components of the display case 906.

Although FIG. 9 illustrates a particular arrangement of the environment 900 including the server(s) 904, the network 902, and the display case 906, various additional or alternative arrangements are possible. For example, while FIG. 9 illustrates a single display case 906 in communication with a network 902 and the server(s) 904, in one or more embodiments multiple display cases may communicate directly with the server(s) 904, bypassing network 902. In addition, the environment 900 may include multiple display cases that each communicate with each other to display digital content, different segments of a single presentation, or for other purposes.

FIGS. 1A-9, the corresponding text, and the examples provide a number of different systems and methods, non-transitory computer readable media, and devices that provide a digital overlay over a view of tangible objects within a display case. In addition to the foregoing, embodiments can also be described in terms of flowcharts comprising acts for accomplishing a particular result. For example, FIG. 10 illustrates a flowchart of an exemplary sequence of acts in accordance with one or more embodiments.

Figure 10:
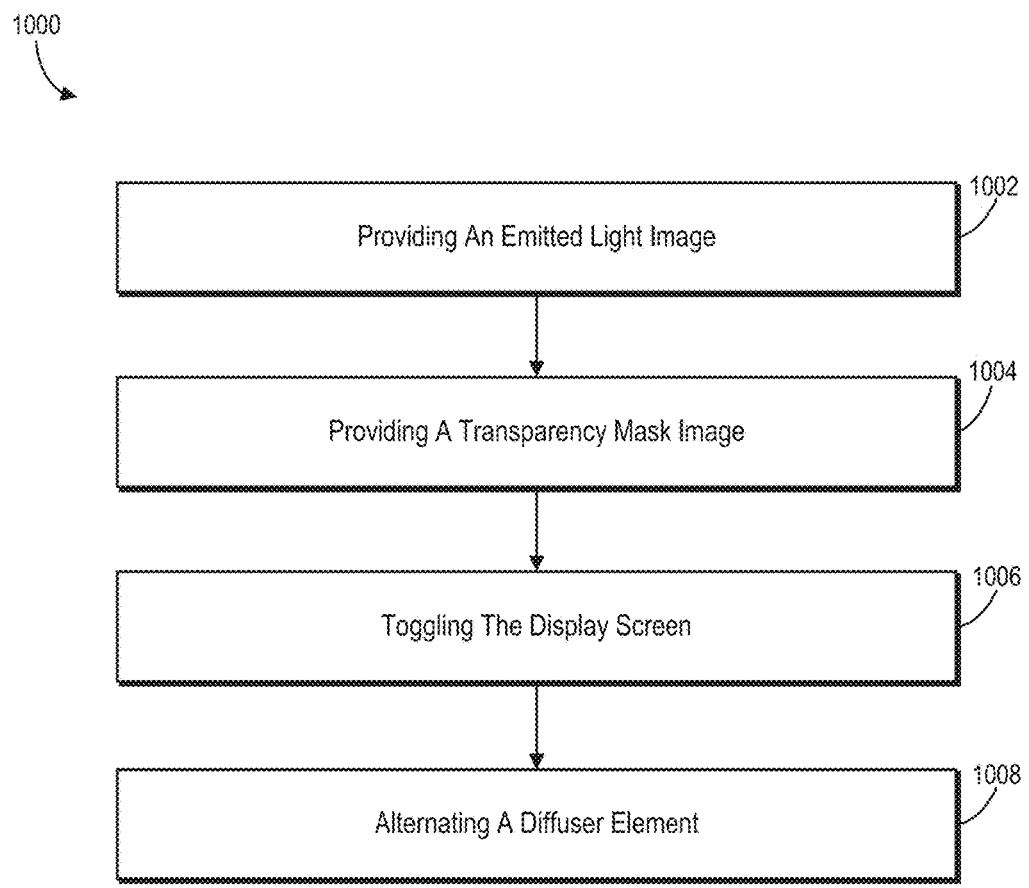
FIG. 10 illustrates a flowchart of a series of acts in a method for displaying a digital overlay over a view of a tangible object within a display case in accordance with one or more embodiments.

While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the steps/acts described herein may be repeated or performed in parallel with one another or in parallel with different instances of the same or other similar steps/acts.

FIG. 10 illustrates an exemplary series of acts 1000 of providing a digital overlay by way of a display screen over a view of the interior of a display case. In particular, the series of acts 1000 can include an act 1002 of providing an emitted light image. For example, the act 1002 can involve providing an emitted light image for display by way of a display screen, wherein the display screen renders the emitted light image by filtering light that passes through the display screen emitted from a diffuser element scattering light provided by a diffuser direct light source while the display screen is in an emissive state.

The series of acts 1000 can further include an act 1004 of providing a transparency mask image. In particular, the act 1004 can involve providing a transparency mask image for display by way of the display screen, wherein the display screen renders the transparency mask image by filtering light that passes through the display screen from an ambient light source while the display screen is in an attenuating state.

As illustrated in FIG. 10, the series of acts 1000 can also include an act 1006 of toggling the display screen. In particular, the act 1006 can include toggling the display screen, at a display rate, between the emissive state and the attenuating state.

As further illustrated in FIG. 10, the series of acts 1000 can include an act 1008 of alternating a diffuser element. In particular, the act 1008 can include alternating a diffuser element, based on the display rate, between a transparent state and a scatter state such that at a first point in time the diffuser element is in the transparent state and the display screen is in the attenuating state and at a second point in time the diffuser element is in the scatter state and the display screen is in the emissive state. Alternating can include toggling, based on the display rate, between utilizing the ambient light source to illuminate the display screen at the first point in time and utilizing the diffuser direct light source by way of the diffuser element to illuminate the display screen at the second point in time. As described above, the diffuser element can be located behind the display screen—e.g., in a direction toward the interior of the display case. The display screen can filter light from the ambient light source at the first point in time to display the transparency mask image, can pass other light from the ambient light source to reveal a view behind the display screen, and the display screen can filter light from the diffuser direct light source at the second point in time to display the emitted light image.

Although not illustrated in FIG. 10, the series of acts 1000 can further include an act of illuminating the display screen by way of an ambient light source that is located behind the diffuser element and that generates the ambient light waves. The series of acts 1000 can still further include an act of illuminating the display screen by way of the diffuser element that scatters light to emit an even glow, wherein the light is provided by a diffuser direct light source located behind the diffuser element.

The series of acts 1000 may still further include an act of synchronizing the display screen, the diffuser element, the diffuser direct light source, and the ambient light source based on the display rate. Synchronizing the display rate may occur such that: at the first point in time the display screen is in the attenuating state, the diffuser element is in the transparent state, the diffuser direct light source is off, and the ambient light source is on, and at the second point in time the display screen is in the emissive state, the diffuser element is in the scatter state, the diffuser direct light source is on, and the ambient light source is off.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
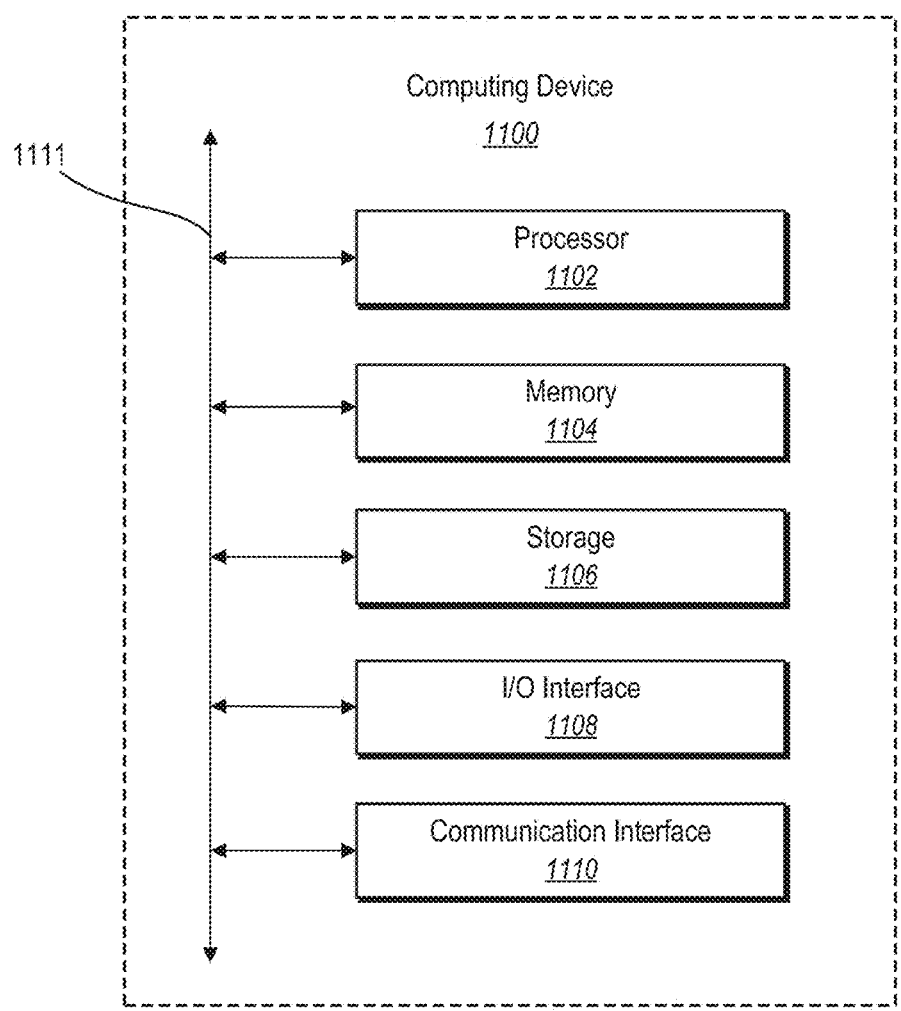
FIG. 11 illustrates a block diagram of an example computing device in accordance with one or more embodiments.

FIG. 11 illustrates, in block diagram form, an exemplary computing device 1100 (e.g., the computing device 800 described above) that may be configured to perform one or more of the processes described above. One will appreciate that the digital content overlay system 802 can comprise implementations of the computing device 1100. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1111. The bus 1111 can comprise hardware, software, or both that couples components of computing device 1100 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A display case for presenting computer-generated digital content overlaid on a view of tangible objects within the display case by way of a multi-layered transmissive display, the display case comprising:
    a display housing comprising an open face and an internal cavity within the display housing;
    a display screen fixably attached to the display housing to cover the open face, wherein the display screen alternates, based on a display rate, between an emissive state where the display screen filters light waves emitted from a diffuser direct light source to display an emitted light image and an attenuating state where the display screen filters light waves from the internal cavity to display a transparency mask image; and
    a diffuser element secured within the display housing, affixed to the display screen, and located directly adjacent to the internal cavity, wherein the diffuser element diffuses light and alternates between a transparent state and a scatter state based on the display rate such that a digital overlay is superimposed on a view of the internal cavity; and
    wherein the diffuser element and the display screen are configured such that:
        at a first point in time the display screen is in the emissive state and the diffuser element is in the scatter state; and
        at a second point in time the display screen is in the attenuating state and the diffuser element is in the transparent state.

2. The display case of claim 1, wherein the diffuser direct light source is aligned to project light in a direction from inside the display case toward the diffuser element and alternates, based on the display rate, between an on state wherein the diffuser direct light source illuminates the diffuser element and an off state wherein the diffuser direct light source is inactive.

3. The display case of claim 2, wherein:
    at the first point in time the diffuser direct light source is in the on state; and
    at the second point in time the diffuser direct light source is in the off state.

4. The display case of claim 3, further comprising an ambient light source aligned to project light within the internal cavity and that alternates, based on the display rate, between a second on state wherein the ambient light source illuminates the display screen and a second off state wherein the ambient light source is inactive, wherein:
    at the first point in time the ambient light source is in the second off state; and
    at the second point in time the ambient light source is in the second on state.

5. The display case of claim 4, wherein the ambient light source is located inside the internal cavity within the display housing affixed to a wall of the display housing adjacent to the internal cavity.

6. The display case of claim 2, wherein:
    the diffuser element is affixed behind the display screen in a direction toward the internal cavity within the display housing; and
    the diffuser direct light source is affixed behind the diffuser element in the direction toward the internal cavity within the display housing.

7. The display case of claim 6, wherein in the scatter state, the diffuser element scatters light provided by the diffuser direct light source to illuminate the display screen.

8. The display case of claim 1, wherein the diffuser element comprises a material that, in response to electrical stimulation, transitions from the transparent state to the scatter state at a rate of at least 60 Hz.

9. A display case for presenting computer-generated digital content overlaid on a view of tangible objects within the display case by way of a multi-layered transmissive display, the display case comprising:
    a display housing comprising an open face and an internal cavity within the display housing;
    a display screen fixably attached to the display housing to cover the open face, wherein the display screen alternates, based on a display rate, between an emissive state where the display screen filters light waves from a diffuser direct light source to display an emitted light image and an attenuating state where the display screen filters light waves from the internal cavity to display a transparency mask image;
    a diffuser element affixed to the display screen and located directly adjacent to the internal cavity and that diffuses light and alternates between a transparent state and a scatter state based on the display rate such that a digital overlay is superimposed on a view of the internal cavity; and
    wherein the diffuser direct light source is located behind the diffuser element within the internal cavity of the display housing and alternates, based on the display rate, between an on state wherein the diffuser direct light source illuminates the diffuser element and an off state wherein the diffuser direct light source is inactive.

10. The display case of claim 9, wherein the diffuser element transitions between the transparent state and the scatter state such that:
at a first point in time the display screen is in the emissive state, the diffuser direct light source is in the on state, and the diffuser element is in the scatter state; and
at a second point in time the display screen is in the attenuating state, the diffuser direct light source is in the off state, and the diffuser element is in the transparent state.

11. The display case of claim 10, wherein the display housing further comprises an opening whereby the internal cavity within the display housing is accessible.

12. The display case of claim 10, further comprising an ambient light source aligned to project light within the internal cavity and that alternates, based on the display rate, between:
a second on state wherein the ambient light source illuminates the display screen; and
a second off state wherein the ambient light source is inactive.

13. The display case of claim 12, wherein:
at the first point in time the ambient light is in the second off state; and
at the second point in time the ambient light source is in the second on state.

14. The display case of claim 13, wherein the ambient light source is located inside the internal cavity within the display housing at a location affixed to a wall of the display housing adjacent to a bottom portion of the internal cavity.

15. The display case of claim 9, wherein in the scatter state, the diffuser element scatters light provided by the diffuser direct light source to illuminate the display screen.

16. A method for displaying a digital content overlay for a tangible object displayed within a display case, the method comprising:
providing an emitted light image for display by way of a display screen, wherein the display screen renders the emitted light image by filtering light emitted from a diffuser element scattering light provided by a diffuser direct light source while the display screen is in an emissive state, wherein the diffuser element is affixed to the display screen and is directly adjacent to an internal cavity located behind the display screen;
providing a transparency mask image for display by way of the display screen, wherein the display screen renders the transparency mask image by filtering light from an ambient light source while the display screen is in an attenuating state;
toggling the display screen, at a display rate, between the emissive state and the attenuating state; and
alternating the diffuser element, based on the display rate, between a transparent state and a scatter state such that at a first point in time the diffuser element is in the transparent state and the display screen is in the attenuating state and at a second point in time the diffuser element is in the scatter state and the display screen is in the emissive state.

17. The method of claim 16, wherein:
the diffuser element is located behind the display screen; and
further comprising illuminating the display screen by way of the ambient light source, wherein the ambient light source is located behind the diffuser element.

18. The method of claim 17, further comprising illuminating the display screen by way of the diffuser element that scatters light, wherein the light is provided by a diffuser direct light source located behind the diffuser element.

19. The method of claim 18, wherein:
alternating comprises toggling, based on the display rate, between utilizing the ambient light source to illuminate the display screen at the first point in time and utilizing the diffuser direct light source by way of the diffuser element to illuminate the display screen at the second point in time;
the display screen is a touchscreen that filters light from the ambient light source at the first point in time to display the transparency mask image; and
the display screen filters light from the diffuser direct light source at the second point in time to display the emitted light image.

20. The method of claim 19, further comprising synchronizing the display screen, the diffuser element, the diffuser direct light source, and the ambient light source based on the display rate such that:
at the first point in time the display screen is in the attenuating state, the diffuser element is in the transparent state, the diffuser direct light source is off, and the ambient light source is on; and
at the second point in time the display screen is in the emissive state, the diffuser element is in the scatter state, the diffuser direct light source is on, and the ambient light source is off.

* * * * *